(12) United States Patent
Jeon

(10) Patent No.: US 11,367,946 B2
(45) Date of Patent: Jun. 21, 2022

(54) ELECTRONIC DEVICE INCLUDING ANTENNA MODULE

(71) Applicant: Samsung Electronics Co., Ltd., Suwon-si (KR)

(72) Inventor: Seunggil Jeon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 78 days.

(21) Appl. No.: 17/071,248

(22) Filed: Oct. 15, 2020

(65) Prior Publication Data

US 2021/0126344 A1 Apr. 29, 2021

(30) Foreign Application Priority Data

Oct. 23, 2019 (KR) .......................... 10-2019-0132511

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 9/0407* (2013.01); *H04M 1/0277* (2013.01)

(58) Field of Classification Search
CPC ........ H01Q 1/243; H01Q 1/38; H01Q 9/0407; H01Q 15/02; H01Q 19/06; H01Q 21/08; H01Q 1/22; H01Q 1/52; H01Q 21/00; H01Q 21/065; H04M 1/0277; H04M 1/0249; H04B 1/40
See application file for complete search history.

(56) References Cited

U.S. PATENT DOCUMENTS 11,139,565 B2 10/2021 Jeon et al.
2008/0029886 A1 2/2008 Cotte et al.
(Continued)

FOREIGN PATENT DOCUMENTS

CN 109698400 A 4/2019
CN 110248008 A 9/2019
(Continued)

OTHER PUBLICATIONS

International Search Report dated Jan. 27, 2021, issued in International Application No. PCT/KR2020/014062.
(Continued)

*Primary Examiner* — David E Lotter
(74) *Attorney, Agent, or Firm* — Jefferson IP Law, LLP

(57) ABSTRACT

An electronic device is provided. The electronic device includes a housing and an antenna module. The housing includes a front plate, a rear plate disposed opposite the front plate, and a lateral member surrounding a space between the front plate and the rear plate and including a conductive portion and a non-conductive portion. The antenna module is disposed in the space and includes a printed circuit board (PCB) and at least one antenna element. The PCB has a first surface disposed to face the lateral member in the space, and a second surface disposed opposite the first surface. The at least one antenna element is disposed on the first surface or near the first surface in the PCB, and forms a beam pattern toward the lateral member.

23 Claims, 18 Drawing Sheets

(51) Int. Cl.
*H01Q 9/04* (2006.01)
*H04M 1/02* (2006.01)

(56) References Cited

U.S. PATENT DOCUMENTS

| | | | |
|---|---|---|---|
| 2013/0027892 A1* | 1/2013 | Lim | H04M 1/0283 |
| | | | 361/679.01 |
| 2017/0201011 A1 | 7/2017 | Khripkov et al. | |
| 2017/0207516 A1* | 7/2017 | Koo | H04M 1/0277 |
| 2018/0026341 A1* | 1/2018 | Mow | H01Q 21/065 |
| | | | 343/702 |
| 2018/0331418 A1* | 11/2018 | Kim | B29C 45/14655 |
| 2020/0028241 A1 | 1/2020 | Jung et al. | |
| 2020/0212544 A1 | 7/2020 | Kwon et al. | |
| 2020/0412849 A1 | 12/2020 | Wang et al. | |

FOREIGN PATENT DOCUMENTS

| | | |
|---|---|---|
| KR | 10-2018-0031120 A | 3/2018 |
| WO | 2019/198862 A1 | 10/2019 |
| WO | 2020/263013 A1 | 12/2020 |

OTHER PUBLICATIONS

Extended European Search Report dated Mar. 31, 2021, issued in European Application No. 20203147.2-1205.
European Office Action dated Dec. 3, 2021, issued in European Application No. 20203147.2-1205.

\* cited by examiner

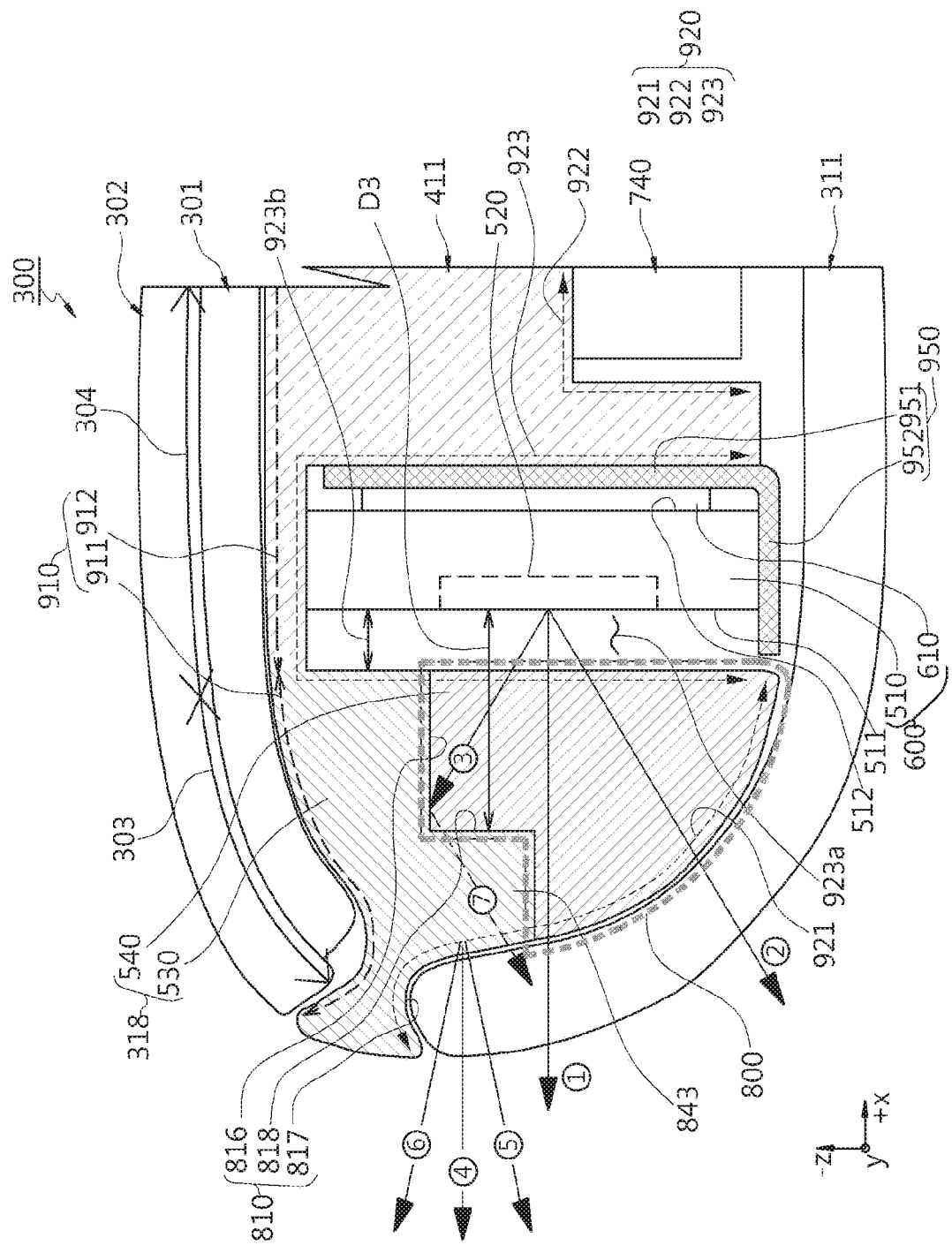

ELECTRONIC DEVICE INCLUDING ANTENNA MODULE

CROSS-REFERENCE TO RELATED APPLICATION(S)

This application is based on and claims priority under 35 U.S.C. § 119(a) of a Korean patent application number 10-2019-0132511, filed on Oct. 23, 2019, in the Korean Intellectual Property Office, the disclosure of which is incorporated by reference herein in its entirety.

BACKGROUND

1. Field

The disclosure relates to an electronic device including an antenna module. More particularly, the disclosure relates to an antenna module capable of reducing the degradation of coverage or antenna radiation performance due to a conductive portion of a housing disposed near a phased array antenna.

2. Description of Related Art

With the development of wireless communication technology, a great variety of electronic devices (e.g., electronic devices for communication) are widely used in everyday life, and thus the use of multimedia contents is explosively increasing. In addition, as data traffic is rapidly increasing, the demand for frequency is increasing, and a technology for using a high frequency band, which is easier to transmit data, for mobile communication is being developed. A recent electronic device may include a phased array antenna (e.g., an antenna array) having high directivity to operate properly in a mobile environment. The electronic device may utilize a beamforming system of processing a transmission signal or a reception signal so that energy radiated from the phased array antenna is concentrated in a specific direction in space.

The electronic device may include a conductive portion (e.g., a metal member) disposed in at least a part of a housing to reinforce rigidity or provide a beautiful appearance, and the phased array antenna may be disposed near the conductive portion inside the housing. In this case, the conductive portion may affect the radiation performance of the phased array antenna. For example, the beamforming system may be configured to form a beam pattern (or an antenna radiation pattern) through the phased array antenna disposed inside the housing, but the conductive portion of the housing may block a radio wave radiated from the phased array antenna. Unfortunately, this may cause the coverage (or communication range) to be reduced or the beam pattern to be deformed (or distorted). In case where a radio wave, such as a millimeter wave (mmWave), having high directivity or sensitive to path loss is transmitted or received, the conductive portion of the housing may make it difficult to ensure the coverage or antenna radiation performance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that includes an antenna module and is capable of reducing the degradation of coverage or antenna radiation performance due to a conductive portion of a housing disposed near a phased array antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing and an antenna module. The housing includes a front plate, a rear plate disposed opposite the front plate, and a lateral member surrounding a space between the front plate and the rear plate and including a conductive portion and a non-conductive portion. The antenna module is disposed in the space and includes a printed circuit board (PCB) and at least one antenna element. The PCB has a first surface disposed to face the lateral member in the space, and a second surface disposed opposite the first surface. The at least one antenna element is disposed on the first surface or near the first surface in the PCB, and forms a beam pattern toward the lateral member. The conductive portion may include, when viewed toward the first surface, a notch having a recessed shape in a direction from the rear plate to the front plate. The non-conductive portion may be disposed at least partially in the notch and face substantially the at least one antenna element. The notch may have a third surface facing substantially the rear plate. The conductive portion may include at least one protrusion extended from a part of the third surface toward the rear plate and spaced apart from the first surface.

An electronic device including an antenna module or structure according to various embodiments of the disclosure can ensure coverage or antenna radiation performance by structurally changing the conductive portion of the housing disposed near a phased array antenna.

In addition, other features, advantages, and effects obtained or predicted from various embodiments of the disclosure will be described explicitly or implicitly in the detailed description of the embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 9A is a cross-sectional view, taken along the line A1-A1' of FIG. 8, illustrating the electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
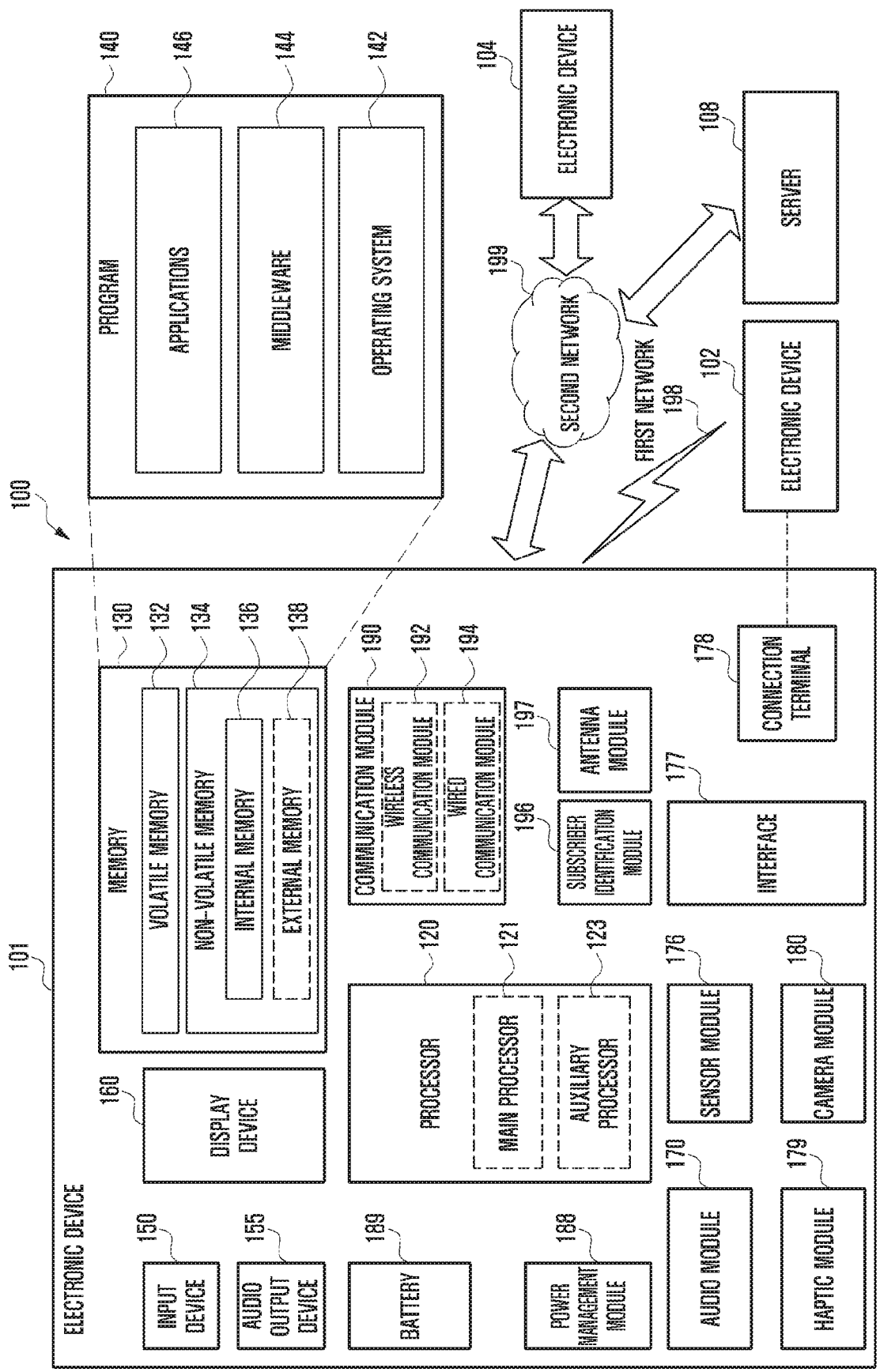
FIG. 1 is a block diagram illustrating an electronic device in a network environment according to an embodiment of the disclosure.

FIG. 1 illustrates an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
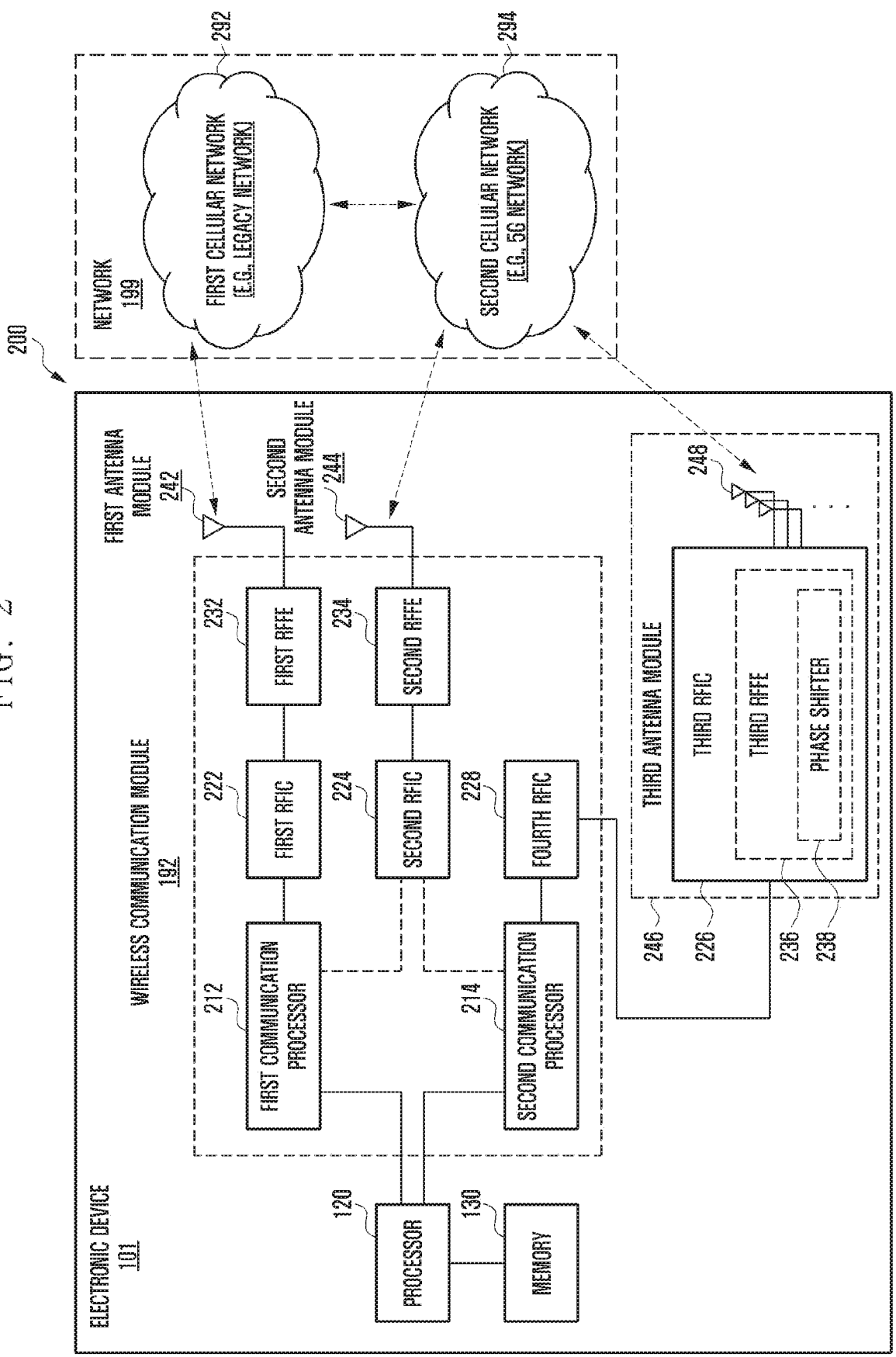
FIG. 2 is a block diagram illustrating an electronic device supporting legacy network communication and 5th generation (5G) network communication according to an embodiment of the disclosure.

FIG. 2 is a block diagram illustrating an electronic device in a network environment including a plurality of cellular networks according to an embodiments of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand-alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
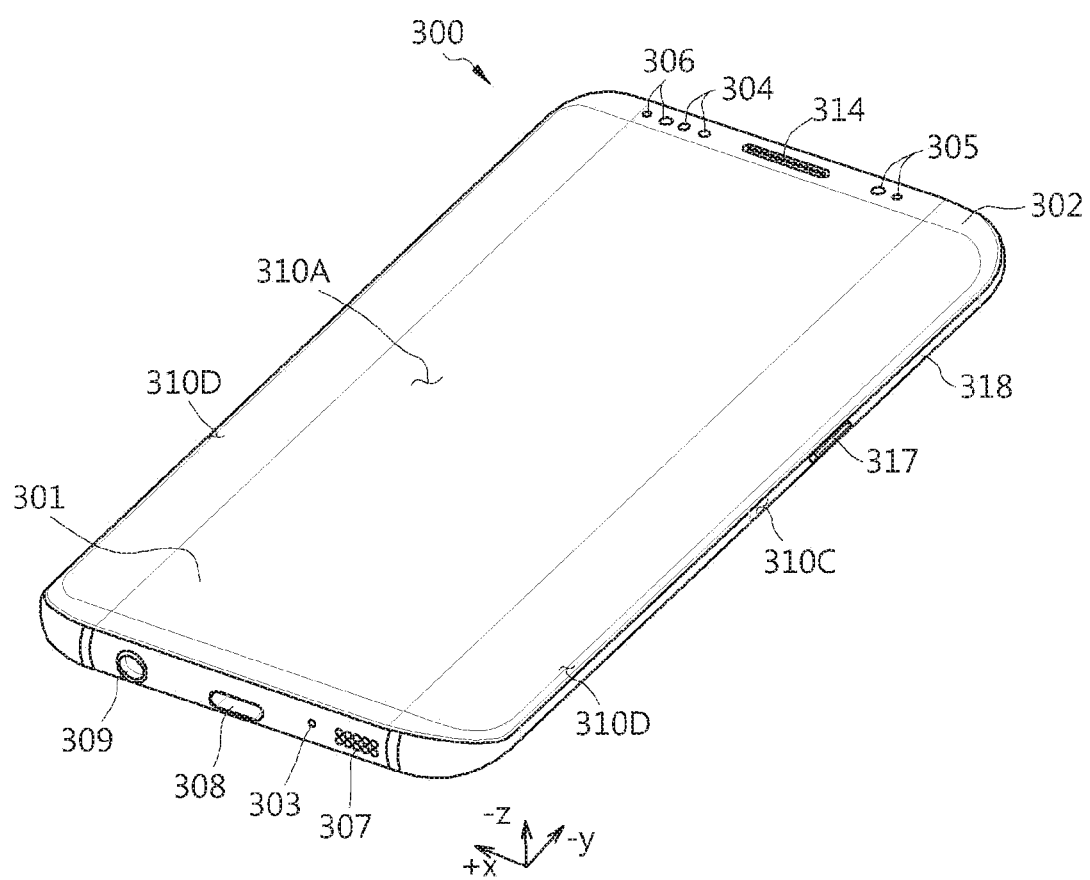
FIG. 3A is a perspective view illustrating a front surface of a mobile electronic device according to an embodiment of the disclosure.

FIG. 3A is a perspective view illustrating a front surface of a mobile electronic device 300 according to an embodiment of the disclosure.

Figure 3B:
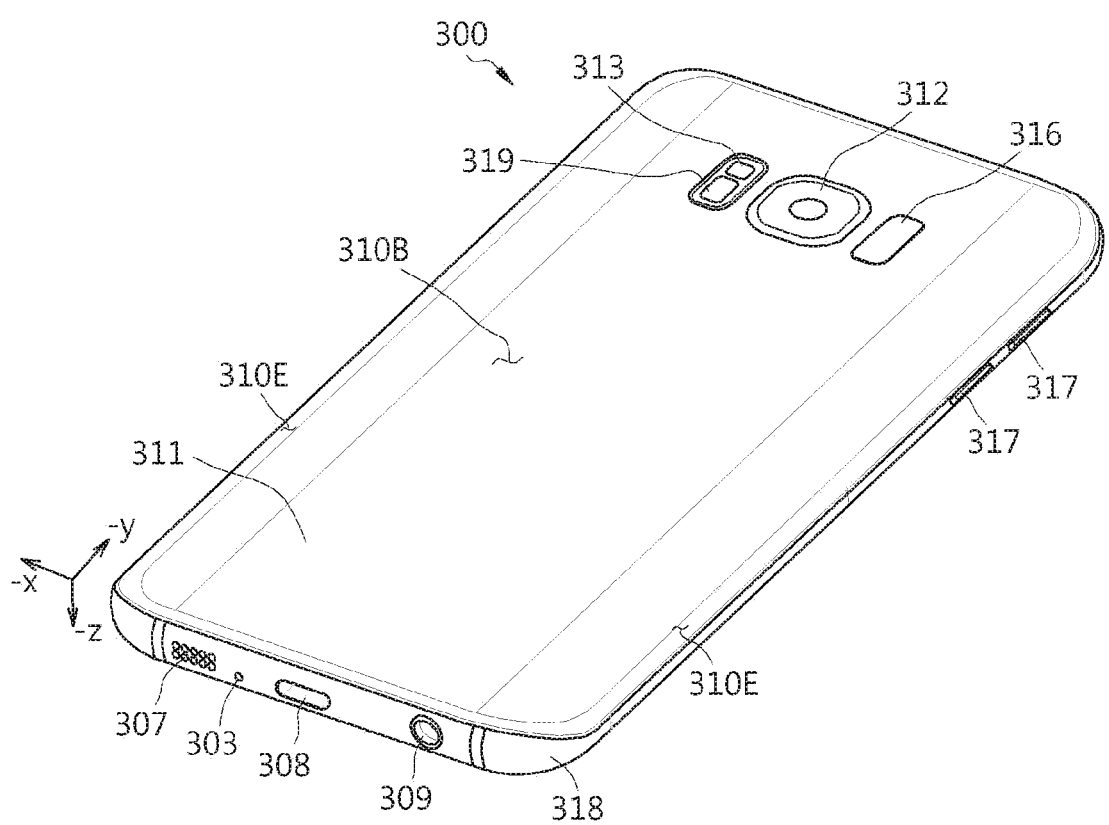
FIG. 3B is a perspective view illustrating a rear surface of the electronic device of FIG. 3A according to an embodiment of the disclosure.

FIG. 3B is a perspective view illustrating a rear surface of the electronic device 300 of FIG. 3A according to an embodiment of the disclosure.

Referring to FIGS. 3A and 3B, an electronic device 300 (e.g., the electronic device of FIG. 1) may include a housing 310 that includes a first surface (or front surface) 310A, a second surface (or rear surface) 310B, and a lateral surface 310C that surrounds a space between the first surface 310A and the second surface 310B. According to another embodiment, the housing 310 may refer to a structure that forms a part of the first surface 310A, the second surface 310B, and the lateral surface 310C. According to an embodiment, the first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. In some embodiments, the rear plate 311 and the lateral bezel structure 318 may be integrally formed and may be of the same material (e.g., a metallic material such as aluminum). In the shown embodiment, the front plate 302 may include two first regions 310D disposed at long edges thereof, respectively, and bent and extended seamlessly from the first surface 310A toward the rear plate 311. In the shown embodiment, the rear plate 311 may include two second regions 310E disposed at long edges thereof, respectively, and bent and extended seamlessly from the second surface 310B toward the front plate 302 (refer to FIG. 3B). In various embodiments, the front plate 302 (or the rear plate 311) may include only one of the first regions 310D (or of the second regions 310E). In various embodiments, the first regions 310D or the second regions 310E may be omitted in part. In the embodiments, when viewed from a lateral side of the electronic device 300, the lateral bezel structure 318 may have a first thickness (or width) on a lateral side where one of the first regions 310D or one of the second regions 310E is not included, and may have a second thickness, being less than the first thickness, on another lateral side where one of the first regions 310D or one of the second regions 310E is included.

According to an embodiment, the electronic device 300 may include at least one of a display 301, audio modules 303, 307 and 314, sensor modules 304, 316 and 319, camera modules 305, 312 and 313, key input devices 317, a light emitting device 306, and connector holes 308 and 309. In various embodiments, the electronic device 300 may omit at least one (e.g., the key input devices 317 or the light emitting device 306) of the above components, or may further include other components. In various embodiments, the electronic device 300 may include the electronic device 101 of FIG. 1.

The display 301 may be exposed through a substantial portion of the front plate 302, for example. In various embodiments, at least a part of the display 301 may be exposed through the front plate 302 that forms the first surface 310A and the first regions 310D. In various embodiments, outlines (i.e., edges and corners) of the display 301 may have substantially the same form as those of the front plate 302. In another embodiment (not shown), the spacing between the outline of the display 301 and the outline of the front plate 302 may be substantially unchanged in order to enlarge the exposed area of the display 301.

In another embodiment (not shown), a recess or opening may be formed in a portion of a display area of the display 301 to accommodate or to be aligned with at least one of the audio modules (e.g., the audio module 314), the sensor module 304, and the camera module 305. In another embodiment (not shown), at least one of the audio modules (e.g., the audio module 314), the sensor module 304, the camera module 305, a fingerprint sensor (e.g. the sensor module 316), and the light emitting device 306 may be disposed on the back of the display area of the display 301. In another embodiment (not shown), the display 301 may be combined with, or adjacent to, a touch sensing circuit, a pressure sensor capable of measuring the touch strength (pressure), and/or a digitizer for detecting a stylus pen. In various embodiments, at least a part of the sensor modules 304 and 319 and/or at least a part of the key input devices 317 may be disposed in one of the first regions 310D and/or one of the second regions 310E.

The audio modules 303, 307 and 314 may correspond to a microphone hole (e.g., the audio module 303) and speaker holes (e.g., the audio modules 307 and 314). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 304, 316, and 319 may generate electrical signals or data corresponding to an internal operating state of the electronic device 300 or to an external environmental condition. The sensor modules 304, 316, and 319 may include a first sensor module (e.g., the sensor module 304) (e.g., a proximity sensor) and/or a second sensor module (e.g., a fingerprint sensor) disposed on the first surface 310A of the housing 310, and/or a third sensor module (e.g., the sensor module 319) (e.g., a heart rate monitor (HRM) sensor) and/or a fourth sensor module (e.g., the sensor module 316) (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor (e.g., the sensor module 304).

The camera modules 305, 312 and 313 may include a first camera device (e.g., the camera module 305) disposed on the first surface 310A of the electronic device 300, and a second camera device (e.g., the camera module 312) and/or a flash (e.g., the camera module 313) disposed on the second surface 310B of the electronic device 300. The camera module 305 or the camera module 312 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 300.

The key input devices 317 may be disposed on the lateral surface 310C of the housing 310. In another embodiment, the electronic device 300 may not include some or all of the key input devices 317 described above, and the key input devices 317 which are not included may be implemented in another form such as a soft key on the display 301. In various embodiments, the key input devices 317 may include a sensor module (not shown) disposed on the second surface 310B of the housing 310.

The light emitting device 306 may be disposed on the first surface 310A of the housing 310, for example. For example, the light emitting device 306 may provide status information of the electronic device 300 in an optical form. In various embodiments, the light emitting device 306 may provide a light source associated with the operation of the camera module 305. The light emitting device 306 may include, for example, a light emitting diode (LED), an infrared (IR) LED, or a xenon lamp.

The connector holes 308 and 309 may include a first connector hole (e.g., the connector hole 308) adapted for a connector (e.g., a universal serial bus (USB) connector) for transmitting and receiving power and/or data to and from an external electronic device, and/or a second connector hole (e.g., the connector hole 309) adapted for a connector (e.g., an earphone jack) for transmitting and receiving an audio signal to and from an external electronic device.

Figure 4:
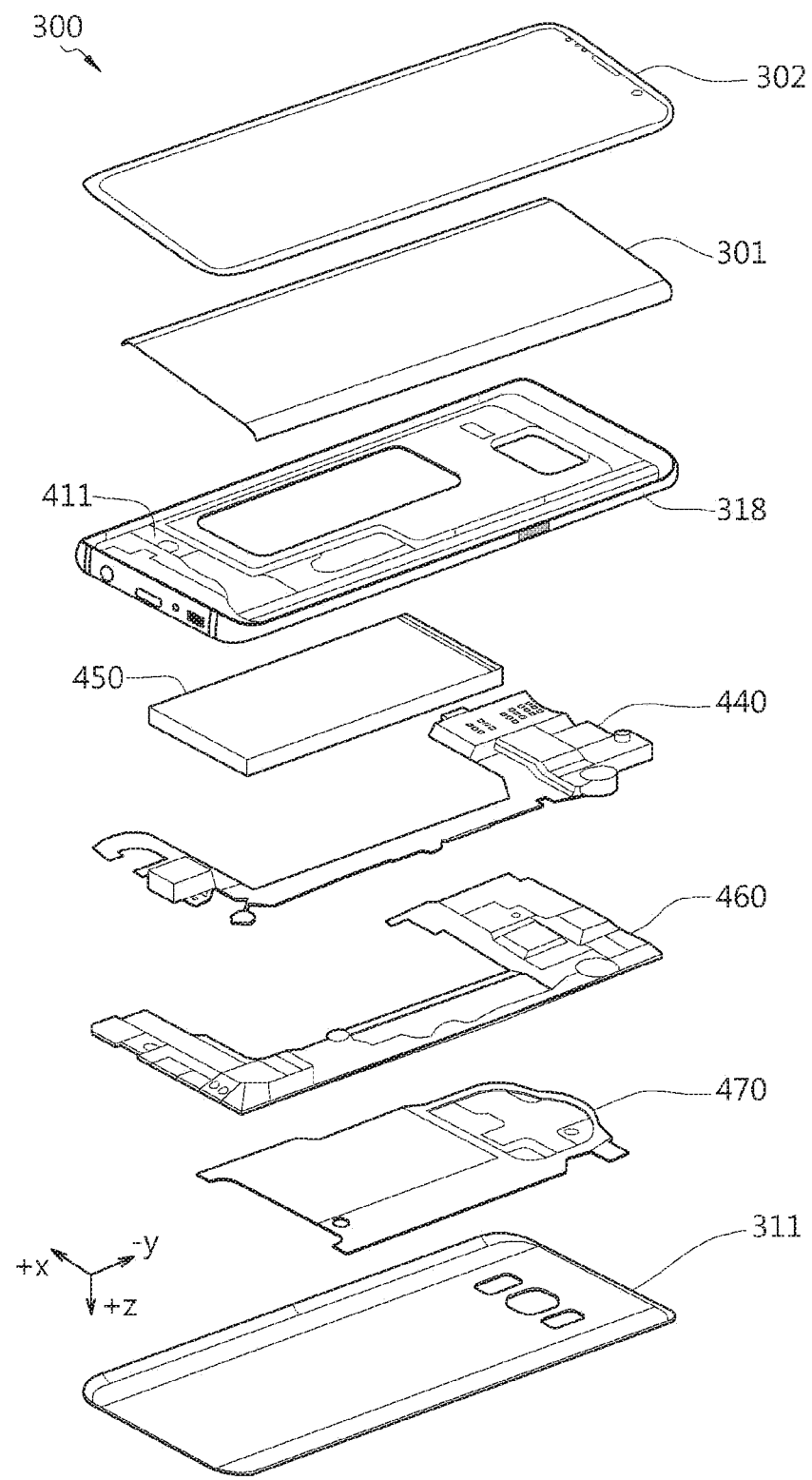
FIG. 4 is an exploded perspective view illustrating the electronic device of FIG. 3A according to an embodiment of the disclosure.

FIG. 4 is an exploded perspective view illustrating the electronic device 300 of FIG. 3A according to an embodiment of the disclosure.

Referring to FIG. 4, the electronic device 300 may include the lateral bezel structure 318, a first support member 411 (e.g., a bracket), the front plate 302, the display 301, a printed circuit board (PCB) 440, a battery 450, a second support member 460 (e.g., a rear case), an antenna 470, and the rear plate 311. In various embodiments, the electronic device 300 may omit at least one (e.g., the first support member 411 or the second support member 460) of the above components or may further include another component. Some components of the electronic device 300 may be the same as or similar to those of the electronic device 300 shown in FIG. 3A or FIG. 3B, thus, descriptions thereof are omitted below.

The first support member 411 is disposed inside the electronic device 300 and may be connected to, or integrated with, the lateral bezel structure 318. The first support member 411 may be formed of, for example, a metallic material and/or a non-metal (e.g., polymer) material. The first support member 411 may be combined with the display 301 at one side thereof and also combined with the PCB 440 at the other side thereof. On the PCB 440, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 450 is a device for supplying power to at least one component of the electronic device 300, and may include, for example, a non-rechargeable primary battery, a rechargeable secondary battery, or a fuel cell. At least a part of the battery 450 may be disposed on substantially the same plane as the PCB 440. The battery 450 may be integrally disposed within the electronic device 300, and may be detachably disposed from the electronic device 300.

The second support member 460, for example, may be coupled to the first support member 411, and may be disposed between the printed circuit board 440 and the rear plate 311. The second support member 460 may be coupled to the first support member 411 with the printed circuit board 440 via a joint mean such as a volt. The second support member 460 may cover the printed circuit board 440 to protect. The second support member 460 may be formed of a metallic material and/or a non-metal (e.g., polymer) material.

The antenna 470 may be disposed between the rear plate 311 and the battery 450. The antenna 470 may include, for example, a near field communication (NFC) antenna, a wireless charging antenna, and/or a magnetic secure transmission (MST) antenna. The antenna 470 may perform short-range communication with an external device, or transmit and receive power required for charging wirelessly. In various embodiments, an antenna structure may be formed by a part or combination of the lateral bezel structure 318 and/or the first support member 411.

Figure 5:
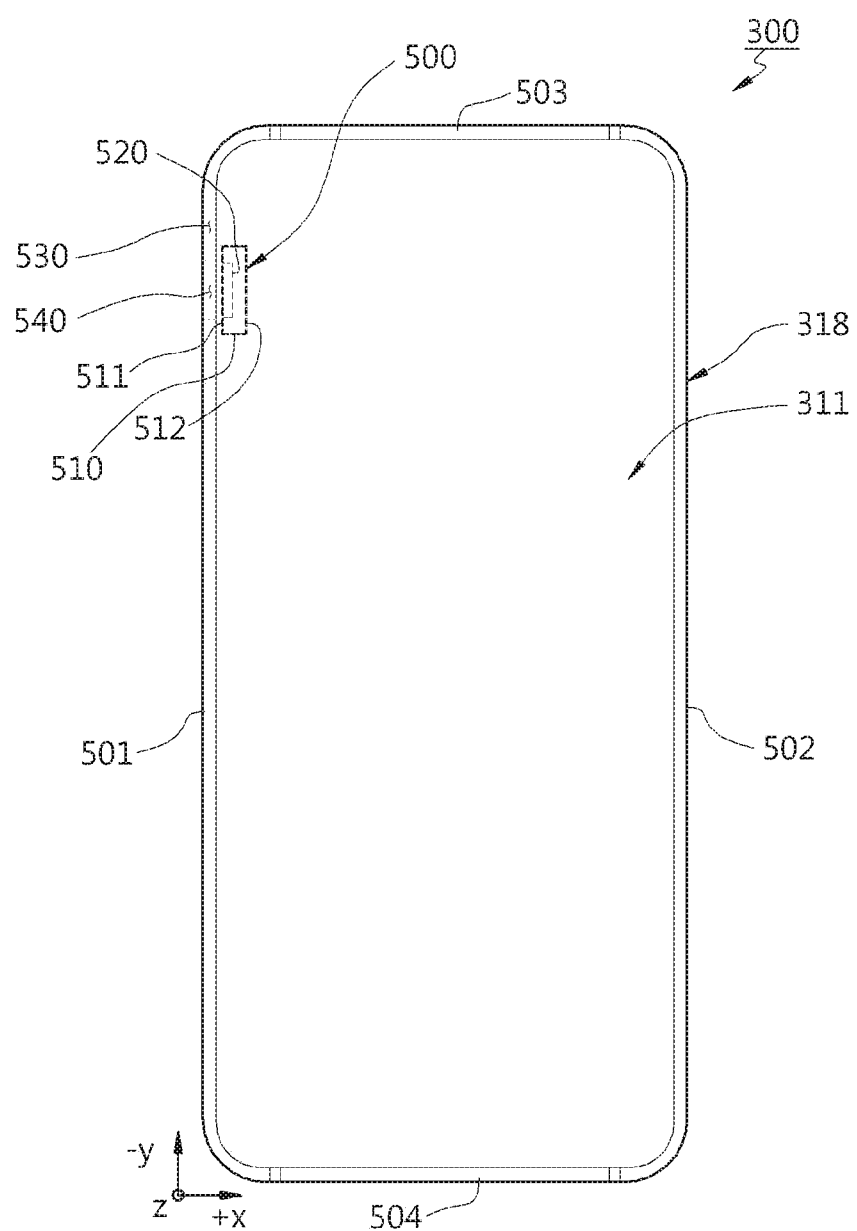
FIG. 5 is a plan view illustrating the electronic device of FIG. 3B according to an embodiment of the disclosure.

FIG. 5 is a plan view illustrating the electronic device of FIG. 3B according to an embodiment of the disclosure.

Referring to FIG. 5, the lateral member 318 may include a first lateral surface 501, a second lateral surface 502, a third lateral surface 503, and a fourth lateral surface 504. The first lateral surface 501 and the second lateral surface 502 may be disposed opposite each other and parallel with each other. The third lateral surface 503 and the fourth lateral surface 504 may be disposed opposite to each other and parallel with each other. The third lateral surface 503 may be perpendicular to the first lateral surface 501 (or the second lateral surface 502) and connect one end of the first lateral surface 501 and one end of the second lateral surface 502. The fourth lateral surface 504 may be perpendicular to the first lateral surface 501 (or the second lateral surface 502) and connect the other end of the first lateral surface 501 and the other end of the second lateral surface 502. A distance between the first lateral surface 501 and the second lateral surface 502 may be smaller than a distance between the third lateral surface 503 and the fourth lateral surface 504.

The electronic device 300 may include at least one antenna structure disposed near the lateral member 318 in the electronic device 300. Although FIG. 5 illustrates one antenna structure 500 disposed near the first lateral surface 501. Alternatively, any number of antenna structures may be disposed at various positions near the first lateral surface 501, the second lateral surface 502, the third lateral surface 503, and/or the fourth lateral surface 504. The antenna structure 500 may include a first printed circuit board (PCB) 510, which may have a first surface 511 disposed to face the lateral member 318, and a second surface 512 disposed opposite the first surface 511. The antenna structure 500 may include an antenna array 520 (e.g., the antenna 248 in FIG. 2) disposed on the first surface 511 or disposed near the first surface 511 in the first PCB 510. The antenna array 520 may include a structure in which a plurality of antenna elements (not shown) having the substantially same type are arranged at regular intervals.

The electronic device 300 may perform beamforming through the antenna array 520. The electronic device 300 may store codebook information related to beamforming in a memory (e.g., the memory 130 in FIG. 1). Based on the codebook information, the electronic device 300 may efficiently control (e.g., allocate or deploy) a plurality of beams through the plurality of antenna elements of the antenna array 520. Additionally, based on the codebook information, the electronic device 300 may adjust phases for the plurality of antenna elements of the antenna array 520. For example, the electronic device 300 may form a beam pattern (e.g., a beam width, a beam direction) by adjusting the phase of a current supplied to the plurality of antenna elements of the antenna array 520. The plurality of antenna elements of the antenna array 520 may form a beam having energy radiated relatively greatly in a direction (e.g., the negative x-axis direction) that the first surface 511 of the first PCB 510 faces.

The lateral member 318 may include a conductive portion 530 and a non-conductive portion 540 combined with the conductive portion 530. The non-conductive portion 540 may be disposed facing the first surface 511 of the antenna structure 500 and, when viewed toward the first surface 511, substantially overlapped with the antenna array 520. The conductive portion 530 may include a notch (not shown) having a recessed shape in a direction from the front plate (e.g., the front plate 302 in FIG. 3A) to the rear plate 311, and the non-conductive portion 540 may be disposed at least partially in the notch. The notch and the non-conductive portion 540 may reduce the effect of the conductive portion 530 of the lateral member 318 on radio waves radiated from the antenna array 520, thereby reducing deformation (or distortion) of the beam pattern or ensuring coverage (or communication range).

Figure 6A:
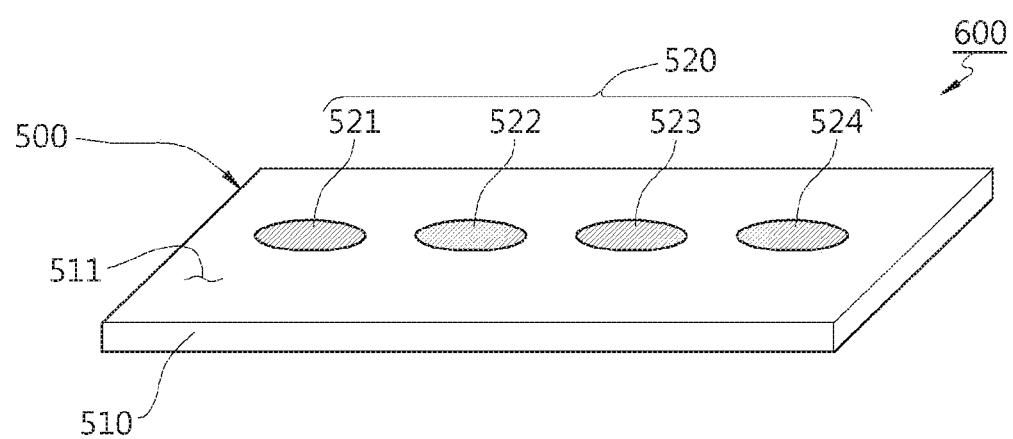
FIGS. 6A and 6B are perspective views illustrating an antenna module according to various embodiments of the disclosure.
Figure 6B:
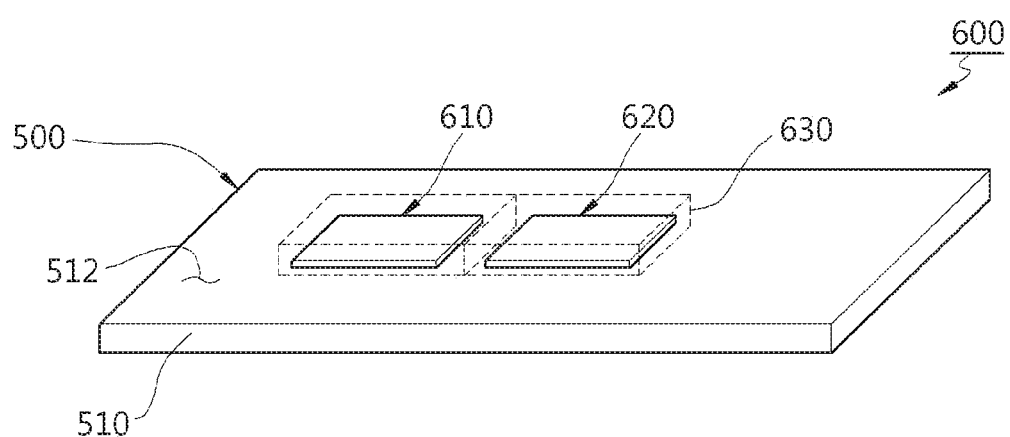
Figure 7:
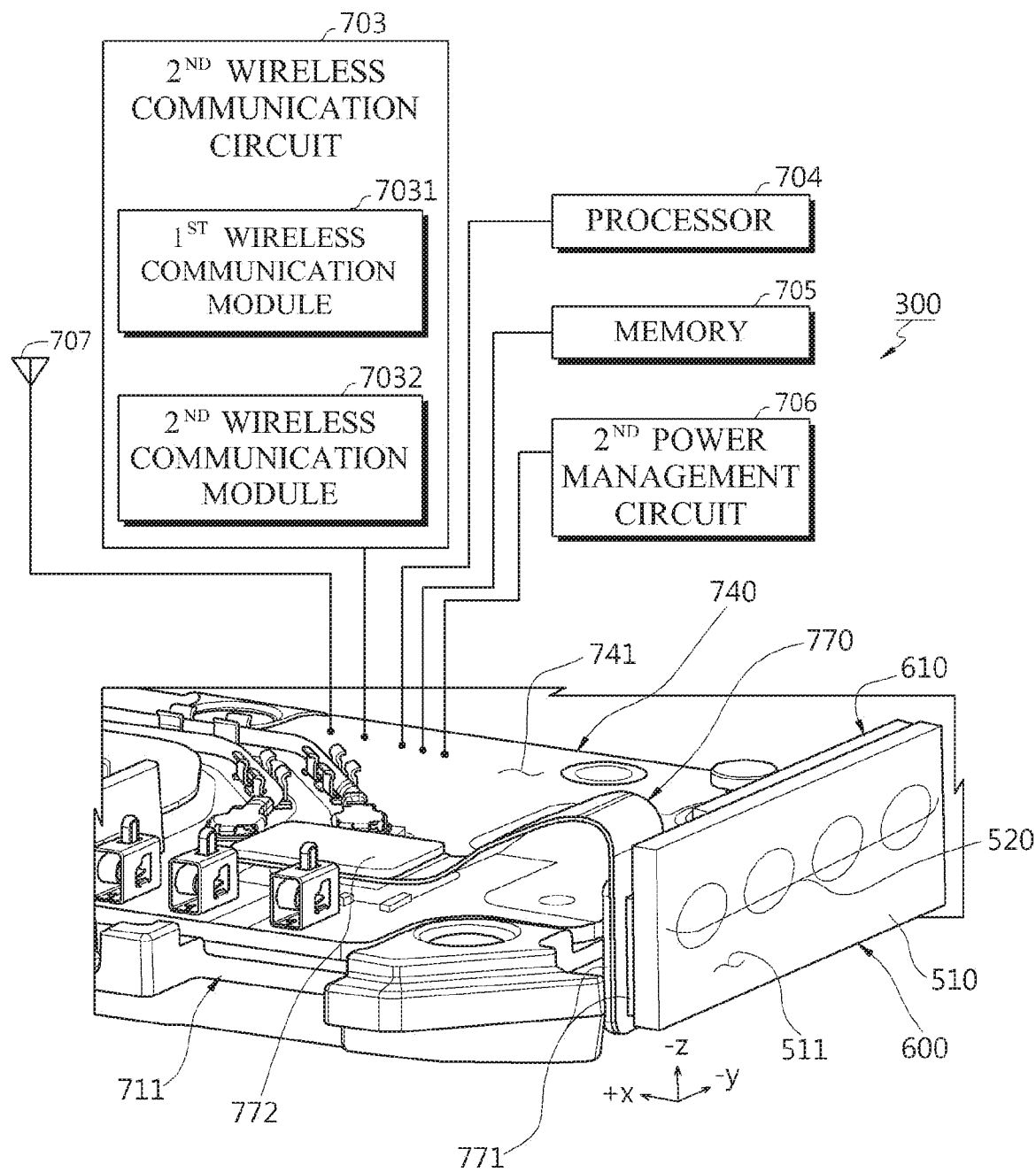
FIG. 7 is a perspective view illustrating an electronic device including an antenna module according to an embodiment of the disclosure.

FIGS. 6A and 6B are perspective views illustrating an antenna module according to various embodiments of the disclosure. FIG. 7 is a perspective view illustrating an electronic device including an antenna module according to an embodiment of the disclosure.

Referring to FIGS. 6A and 6B, the antenna module 600 may include an antenna structure 500, a first wireless communication circuit 610, and/or a first power management circuit 620. The antenna module 600 may be, for example, the third antenna module 246 shown in FIG. 2.

The antenna structure 500 may include the first PCB 510 on which the antenna array 520 is disposed. The first PCB 510 may have the first surface 511 and the second surface 512 disposed opposite the first surface 511. The antenna array 520 may include a plurality of antenna elements 521, 522, 523, and 524 disposed on the first surface 511 or disposed near the first surface 511 in the first PCB 510. The plurality of antenna elements 521, 522, 523, and 524 may be, for example, the antenna 248 shown in FIG. 2.

The plurality of antenna elements 521, 522, 523, and 524 may have substantially the same shape and be disposed at regular intervals. The first PCB 510 may include a plurality of conductive layers (e.g., a plurality of conductive pattern layers) and a plurality of non-conductive layers (e.g., insulating layers) stacked alternately with the plurality of conductive layers. The plurality of antenna elements 521, 522, 523, and 524 may be implemented, for example, with at least some of the plurality of conductive layers. The number or locations of the antenna elements included in the antenna array 520 may be varied without being limited to an example shown in FIG. 6A.

The plurality of antenna elements 521, 522, 523, and 524 may include a patch antenna (or microstrip). The plurality of antenna elements 521, 522, 523, and 524 may be implemented with a dipole antenna or a loop antenna (not shown).

The first wireless communication circuit 610 may be disposed on the second surface 512 of the first PCB 510 through a conductive bonding member such as solder. The first wireless communication circuit 610 may be electrically connected to the plurality of antenna elements 521, 522, 523, and 524 through wires (e.g., electrical paths each formed of a conductive pattern and/or a via) included in the first PCB 510. The first wireless communication circuit 610 may be a radio frequency integrated circuit (RFIC) (e.g., the third RFIC 226 in FIG. 2).

The plurality of antenna elements 521, 522, 523, and 524 may be directly fed with power by the first wireless communication circuit 610, thereby operating as an antenna radiator (e.g., a patch antenna).

According to another embodiment of the present disclosure, each of the plurality of antenna elements 521, 522, 523, and 524 may be utilized as a dummy element (e.g., a dummy antenna, a dummy patch, or a conductive patch). The dummy element may be physically separated from any other conductive element, thus being in an electrically floating state. The first PCB 510 may include a plurality of second antenna elements (not shown) that are overlapped at least in part with the plurality of antenna elements 521, 522, 523, and 524, when viewed toward the first surface 511, and physically separated from the plurality of antenna elements 521, 522, 523, and 524. When viewed toward the first surface 511, the plurality of second antenna elements may have substantially the same shape as the plurality of antenna elements 521, 522, 523, and 524. When viewed from above the first surface 511, the plurality of antenna elements 521, 522, 523, and 524 may be different in shape from the plurality of second antenna elements. The plurality of second antenna elements may be electrically connected to the first wireless communication circuit 610 and operated as feeders (or a feeding pattern) for indirectly feeding power to the plurality of antenna elements 521, 522, 523, and 524. The plurality of antenna elements 521, 522, 523, and 524 may be electromagnetically coupled with the plurality of second antenna elements electrically connected to the first wireless communication circuit 610, thereby operating as an antenna radiator or adjusting radiation characteristics. For example, the plurality of antenna elements 521, 522, 523, and 524 may shift the resonant frequency of the antenna structure 500 to a specific frequency or by a specific amount. For example, the plurality of antenna elements 521, 522, 523, and 524 may expand a bandwidth for transmitting or receiving a signal through the antenna structure 500 or form different frequency bands (e.g., a multi-band). For example, the plurality of antenna elements 521, 522, 523, and 524 may reduce electromagnetic noise to improve antenna performance.

According to an embodiment of the present disclosure, the antenna structure 500 may include a ground plane (or a ground layer) (not shown) implemented with at least some of the plurality of conductive layers included in the first PCB 510. The ground plane may be disposed between the antenna array 520 and the second surface 512 and, when viewed toward the first surface 511, overlapped at least partially with the antenna array 520. The ground plane may be electrically connected to the first wireless communication circuit 610 through an electrical path formed of a conductive pattern and/or a via included in the first PCB 510. The ground plane may be related to the radiation characteristics of the antenna array 520. For example, the radiation characteristics of the antenna array 520 may be determined based on a distance at which the plurality of antenna elements 521, 522, 523, and 524 are spaced apart from the ground plane. For example, the radiation characteristics of the antenna array 520 may be determined based on the shape (e.g., width, length, and/or thickness) of the ground plane. For example, the radiation characteristics of the antenna array 520 may be determined based on an insulating material (e.g., dielectric constant) interposed between the plurality of antenna elements 521, 522, 523, and 524 and the ground plane. The ground plane may shield or reduce electromagnetic noise of a signal or power flow in the first PCB 510.

The first power management circuit 620 may be disposed on the second surface 512 of the first PCB 510 through a conductive bonding member such as solder. In addition, the first power management circuit 620 may be electrically connected to the first wireless communication circuit 610 or various other components (e.g., connectors, passive elements) disposed in/on the first PCB 510 through wires (e.g., an electrical path formed of a conductive pattern and/or a via) included in the first PCB 510. The first power management circuit 620 may be a power management integrated circuit (PMIC).

The antenna module 600 may further include a shielding member 630 disposed on the second surface 512 to surround at least one of the first wireless communication circuit 610 and the first power management circuit 620. The shielding member 630 may electromagnetically shield the first wireless communication circuit 610 and/or the first power management circuit 620. For example, the shielding member 630 may include a conductive member such as a shield can. In another example, the shielding member 630 may include a protective member such as urethane resin, and a conductive paint such as EMI paint coated on the protective member. The shielding member 630 may be implemented with various shielding sheets disposed to cover the second surface 512.

The antenna module 600 may further include a frequency adjusting circuit disposed on the first PCB 510. The radiation characteristics and impedance of the antenna array 520 are related to antenna performance, and may be varied according to the shape, size, and/or material of the antenna element. The radiation characteristics of the antenna element may include an antenna radiation pattern (or antenna pattern), which is a directional function indicating a relative distribution of power radiated from the antenna element, and a polarization state (or antenna polarization) of radio waves radiated from the antenna element. The impedance of the antenna element may be related to power transfer from a transmitter to the antenna element or power transfer from the antenna element to a receiver. In order to minimize reflection at a connecting point between a transmission line and the antenna element, the impedance of the antenna element is designed to match the impedance of the transmission line. This may realize maximized power transmission (or minimized power loss) or efficient signal transmission through the antenna element. Impedance matching may lead to an efficient signal flow at a specific frequency (or resonant frequency). In contrast, impedance mismatch may invite power loss or reduce transmit/receive signals and thereby lower communication performance. The frequency adjusting circuit (e.g., a tuner or a passive element) disposed on the first PCB 510 may solve such impedance mismatch. The frequency adjusting circuit may shift the resonant frequency of the antenna to a specific frequency or by a specific amount.

FIG. 7 is a perspective view illustrating an electronic device including an antenna module according to an embodiment of the disclosure.

Referring to FIG. 7, the electronic device 300 (e.g., the electronic device 101 in FIG. 1, or the electronic device 300 in FIG. 3A) may include a second PCB 740 (e.g., the PCB 440 in FIG. 4), the antenna module 600, a support member 711 (e.g., the first support member 411 in FIG. 4), and a flexible PCB (FPCB) 770. The second PCB 740 and/or the antenna module 600 may be disposed on the support member 711, and the FPCB 770 may electrically connect the second PCB 740 and the antenna module 600.

The electronic device 300 may include a second wireless communication circuit 703 (e.g., the wireless communication module 192 in FIG. 2), a processor 704 (e.g., the processor 120 in FIG. 2), a memory 705 (e.g., the memory 130 in FIG. 1), a second power management circuit 706 (e.g., the power management module 188 in FIG. 1), and/or at least one antenna 707, all of which are electrically connected to the second PCB 740. The second wireless communication circuit 703, the processor 704, the memory 705, and/or the second power management circuit 706 may be disposed on the second PCB 740 through a conductive bonding member such as solder. The at least one antenna 707 (e.g., the first antenna module 242 or the second antenna module 244 in FIG. 2) may be separated from the second PCB 740 and electrically connected to the second PCB 740 through various electrical paths. The at least one antenna 707 may be disposed on the second PCB 740 or implemented with a conductive pattern (e.g., microstrip) included in the second PCB 740. The at least one antenna 707 may be implemented with at least a part of the housing (e.g., the lateral bezel structure 318 in FIG. 3A) forming the outward appearance of the electronic device 300.

The second PCB 740 may have, for example, one surface 741 and the opposite surface (not shown). In an embodiment, referring to FIGS. 6A, 6B and 7, the first surface 511 and/or the second surface 512 of the first PCB 510 may not be parallel with the one surface 741 of the second PCB 740. For example, the first surface 511 and/or the second surface 512 of the first PCB 510 may be disposed perpendicular to the one surface 741 of the second PCB 740.

The antenna module 600 may be electrically connected to the second PCB 740 through the FPCB 770. The antenna module 600 may be, for example, the third antenna module 246 shown in FIG. 2. The FPCB 770 may include a first connector 771 disposed at one end thereof and a second connector 772 disposed at the other end thereof. The first connector 771 may be electrically connected to a connector (not shown) disposed on the first PCB 510, and the second connector 772 may be electrically connected to a connector (not shown) disposed on the second PCB 740. The FPCB 770 may be replaced with any other electrical path such as a coaxial cable (not shown). According to various embodiments (not shown), the antenna module 600 may be electrically connected to the second PCB 740 through various electrical paths such as a board-to-board connector or an interposer. For example, a part of the first PCB 510 may be disposed on the second PCB 740 or inserted into a connector, such as a socket, which is electrically connected to the second PCB 740, thereby implementing a structure electrically connected to the second PCB 740.

According to an embodiment of the disclosure, through the antenna array 520, the first wireless communication circuit 610 may transmit and/or receive a first signal of a certain frequency band which is at least a part ranging from about 6 GHz to about 100 GHz. The first wireless communication circuit 610 may include the third RFIC 226 shown in FIG. 2. The first wireless communication circuit 610 may up-convert or down-convert a frequency of a signal to be transmitted or received. The first wireless communication circuit 610 may receive an IF signal from a second wireless communication module 7032 of the second wireless communication circuit 703, and then up-convert the received IF signal into an RF signal. The first wireless communication circuit 610 may down-convert an RF signal (e.g., millimeter wave) received through the antenna array 520 (e.g., the antenna 249 in FIG. 2) into an IF signal, and then provide the IF signal to a second wireless communication module 7032 of the second wireless communication circuit 703.

The first wireless communication circuit 610 may include at least one phase shifter (e.g., the phase shifter 238 in FIG. 2) electrically connected to the plurality of antenna elements included in the antenna array 520. Upon transmission, the at least one phase shifter may convert a phase of a 5G Above6 RF signal to be transmitted to the outside (e.g., a base station of a 5G network) of the electronic device 300 through the antenna elements. Upon reception, the at least one phase shifter may convert a phase of a 5G Above6 RF signal, received from the outside through the antenna elements, into the same phase or substantially the same phase. The at least one phase shifter may enable transmission or reception through beamforming between the electronic device 300 and the outside.

At least some of the plurality of conductive layers included in the first PCB 510 may include a transmission line (e.g., an RF line) between the antenna array 520 and the first wireless communication circuit 610. The transmission line is a structure for transmitting a frequency signal (e.g., voltage or current) and may be a conductive system using a wave transfer function by electrical parameters (e.g., resistance, inductance, conductance, or capacitance per unit length). For example, some of the plurality of conductive layers included in the first PCB 510 may include an electrical path for supplying power to the antenna array 520 between the antenna array 520 and the first wireless communication circuit 610.

The processor 704 may execute software to control at least one component (e.g., hardware or software component) of the electronic device 300 electrically connected thereto, and may also perform processing or arithmetic operation of various data. The processor 704 may transmit and/or receive a signal through the second wireless communication circuit 703. Also, the processor 704 may write or read data to or from the memory 705. In addition, the processor 704 may perform functions of a protocol stack required for a communication standard. At least a part of the second wireless communication circuit 703 and/or the processor 704 may be referred to as a communication processor (CP) (e.g., the first CP 212 and/or the second CP 214 in FIG. 2).

The second wireless communication circuit 703 (e.g., the wireless communication module 192 in FIG. 2) may perform functions for transmitting/receiving a signal through a radio channel. The second wireless communication circuit 703 may perform a function of changing between a baseband signal and a bit string in accordance with a physical layer standard of the system. For example, in case of data transmission, the second wireless communication circuit 703 may generate complex symbols by encoding and modulating a transmission bit string. Also, in case of data reception, the second wireless communication circuit 703 may restore a reception bit string by demodulating and decoding a baseband signal. The second wireless communication circuit 703 may up-convert an RF signal and then transmit it through at least one antenna, and also down-convert an RF signal, received through at least one antenna, into a baseband signal. The second wireless communication circuit 703 may include components such as a transmission filter, an amplifier, a mixer, an oscillator, a digital-to-analog converter (DAC), and/or an analog-to-digital converter (ADC).

The second wireless communication circuit 703 may include a plurality of wireless communication modules for processing signals of different frequency bands. For example, the second wireless communication circuit 703 may include the plurality of wireless communication modules to support different wireless access techniques. Such different wireless access techniques may include, for example, Bluetooth low energy (BLE) technique, WiFi technique, WiFi Gigabyte (WiGig) technique, and/or cellular network technique (e.g., long term evolution (LTE)). In addition, such different frequency bands may include a super high frequency (SHF) (e.g., about 2.5 GHz or about 5 GHz) band and a millimeter wave (e.g., about 60 GHz) band.

The second wireless communication circuit 703 may include a baseband processor, at least one communication circuit (e.g., an intermediate frequency integrated circuit (IFIC)), and/or a radio frequency integrated circuit (RFIC). The baseband processor included in the second wireless communication circuit 703 may be different from the processor 704 (e.g., an application processor (AP)).

The second wireless communication circuit 703 may include the first wireless communication module 7031 and/or the second wireless communication module 7032. The electronic device 300 may further include one or more interfaces for supporting inter-chip communication between the second wireless communication circuit 703 and the processor 704. The processor 704 and each of the first and second wireless communication modules 7031 and 7032 may transmit/receive data (or signals) using such an inter-chip interface (e.g., an inter-processor communication channel).

Each of the first wireless communication module 7031 and the second wireless communication module 7032 may provide an interface for performing communication with other entities. For example, the first wireless communication module 7031 may support wireless communication for a first network (e.g., the first cellular network 292 in FIG. 2) that utilizes the at least one antenna 707. The first wireless communication module 7031 may include, for example, the first RFIC 222 and/or the first RFFE 232 shown in FIG. 2. For example, the second wireless communication module 7032 may support wireless communication for a second network (e.g., the second cellular network 294 in FIG. 2) that utilizes the antenna module 600. The second wireless communication module 7032 may include, for example, the fourth RFIC 228 shown in FIG. 2. The first network may include a 4th generation (4G) network, and the second network may include a 5th generation (5G) network. The first network may be associated with WiFi or global positioning system (GPS).

The first wireless communication module 7031 may receive a high-frequency signal (hereinafter, an RF signal) related to the first network (e.g., the 4G network) through the at least one antenna 707, modulate (e.g., down-convert) the received RF signal into a low-frequency signal (hereinafter, a baseband signal), and transmit the baseband signal to the processor 704. In addition, the first wireless communication module 7031 may receive a baseband signal related to the first network from the processor 704, modulate (e.g., up-convert) the received baseband signal into an RF signal, and transmit the RF signal to the air through the at least one antenna 707. The first wireless communication module 7031 may include the RFIC. When modulating an RF signal into a baseband signal and vice versa, an input of a local oscillator (LO) may be utilized.

The second wireless communication module 7032 may receive a baseband signal related to the second network from the processor 704. Then, the second wireless communication module 7032 may up-convert the baseband signal into an intermediate frequency (IF) signal by using an input (hereinafter, an LO signal) of the local oscillator, and transmit the IF signal to the antenna module 600. The antenna module 600 may receive the IF signal from the second wireless communication module 7032. The antenna module 600 may up-convert the IF signal into an RF signal by using the LO signal, and transmit the RF signal to the air through the antenna array 520 included in the antenna module 600. The antenna module 600 may receive an RF signal through the antenna array 520. Then, the antenna module 600 may down-convert the RF signal into an IF signal by using the LO signal, and transmit the IF signal to the second wireless communication module 7032. The second wireless communication module 7032 may receive the IF signal from the antenna module 600. The second wireless communication module 7032 may down-convert the IF signal into a baseband signal by using the LO signal, and transmit the baseband signal to the processor 704. The second wireless communication module 7032 may include the IFIC. The second wireless communication module 7032 may transmit and/or receive a second signal of a frequency band between about 5 GHz and about 15 GHz.

The second wireless communication module 7032 or the first wireless communication circuit 610 may include a plurality of transmission/reception paths. For example, the second wireless communication module 7032 or the first wireless communication circuit 610 may include a beamforming system that processes transmission/reception signals such that energy radiated from the plurality of antenna elements 521, 522, 523, and 524 of the antenna array 520 is concentrated in a specific direction in space. The beamforming system may be configured to receive a signal having higher strength in a desired direction, transmit a signal in a desired direction, and/or disallow a signal to be received from an unwanted direction. The beamforming system may adjust the shape and direction of a beam by using a difference in amplitude or phase of a carrier signal in the RF band. The second wireless communication module 7032 or the first wireless communication circuit 610 may control the respective antenna elements to have a phase difference. For example, the second wireless communication module 7032 or the first wireless communication circuit 610 may have a first electrical path electrically connected to a first point on the first antenna element, and a second electrical path electrically connected to a second point on the second antenna element. The processor 704, the second wireless communication module 7032, or the first wireless communication circuit 610 may provide a phase difference between a first signal at the first point and a second signal at the second point. The electronic device 300 may include one or more phase shifters (not shown) disposed on the antenna module 600 (or the first wireless communication circuit 610) or the first PCB 510. The one or more phase shifters may adjust the phase for the plurality of antenna elements 521, 522, 523, and 524 of the antenna array 520.

For example, the beamforming system may form a beam pattern (e.g., a beam width, a beam direction) by adjusting the phase of a current supplied to the plurality of antenna elements 521, 522, 523, and 524 of the antenna array 520. By the beamforming system, the plurality of antenna elements 521, 522, 523, and 524 of the antenna array 520 may form a beam having energy radiated relatively greatly in a direction (e.g., the negative x-axis direction) that the first surface 511 of the first PCB 510 faces.

According to an embodiment of the disclosure (not shown), the first PCB 510 may be disposed substantially in parallel with the second PCB 740. For example, the second surface 512 of the first PCB 510 may be disposed to face the one surface 741 of the second PCB 740. Even when the first PCB 510 is disposed in parallel with the second PCB 740, the beamforming system may form a beam having energy radiated relatively greatly in the negative x-axis direction by adjusting the phase of a current supplied to the plurality of antenna elements 521, 522, 523, and 524 of the antenna array 520. A second antenna array may be added to the antenna module 600, and in a structure where the first PCB 510 is disposed in parallel with the second PCB 740, the beamforming system may form a beam (e.g., a broadside type beam) in a direction of the first surface 511 through the antenna array 520 (e.g., a patch antenna) and also form a beam (e.g., an endfire type beam) in the negative x-axis direction through the second antenna array (e.g., a dipole antenna). The non-conductive portion 540 shown in FIG. 5 may make it possible to reduce deformation (or distortion) of the beam formed in the negative x-axis direction or ensure coverage even in a structure where the first PCB 510 is disposed in parallel with the second PCB 740.

The memory 705 may store codebook information about beamforming. Based on the codebook information, the processor 704, the second wireless communication module 7032, and/or the first wireless communication circuit 610 may efficiently control (e.g., allocate or deploy) multiple beams through the plurality of antenna elements 521, 522, 523, and 524 of the antenna array 520.

The first wireless communication module 7031 and/or the second wireless communication module 7032 may form one module with the processor 704. For example, the first wireless communication module 7031 and/or the second wireless communication module 7032 may be integrally formed with the processor 704. The first wireless communication module 7031 and/or the second wireless communication module 7032 may be disposed in one chip or implemented in the form of an independent chip.

The processor 704 and one wireless communication module (e.g., the first wireless communication module 7031) may be integrally formed in one chip (i.e., SoC chip), and the other wireless communication module (e.g., the second wireless communication module 7032) may be formed in another chip.

The second power management circuit 706 may manage power supplied to the electronic device 300 by using power of a battery (e.g., the battery 189 in FIG. 1) electrically connected to the second PCB 740. The first power management circuit 620 shown in FIG. 6B may receive power from the second power management circuit 706 through an electrical path such as the FPCB 770 and manage power supplied to the antenna module 600 by using the received power. According to an embodiment, the first power management circuit 620 may be implemented, for example, with at least a part of the PMIC. The first power management circuit 620 may be omitted from the antenna module 600, and instead the second power management circuit 706 may manage power supplied to the antenna module 600.

Figure 8:
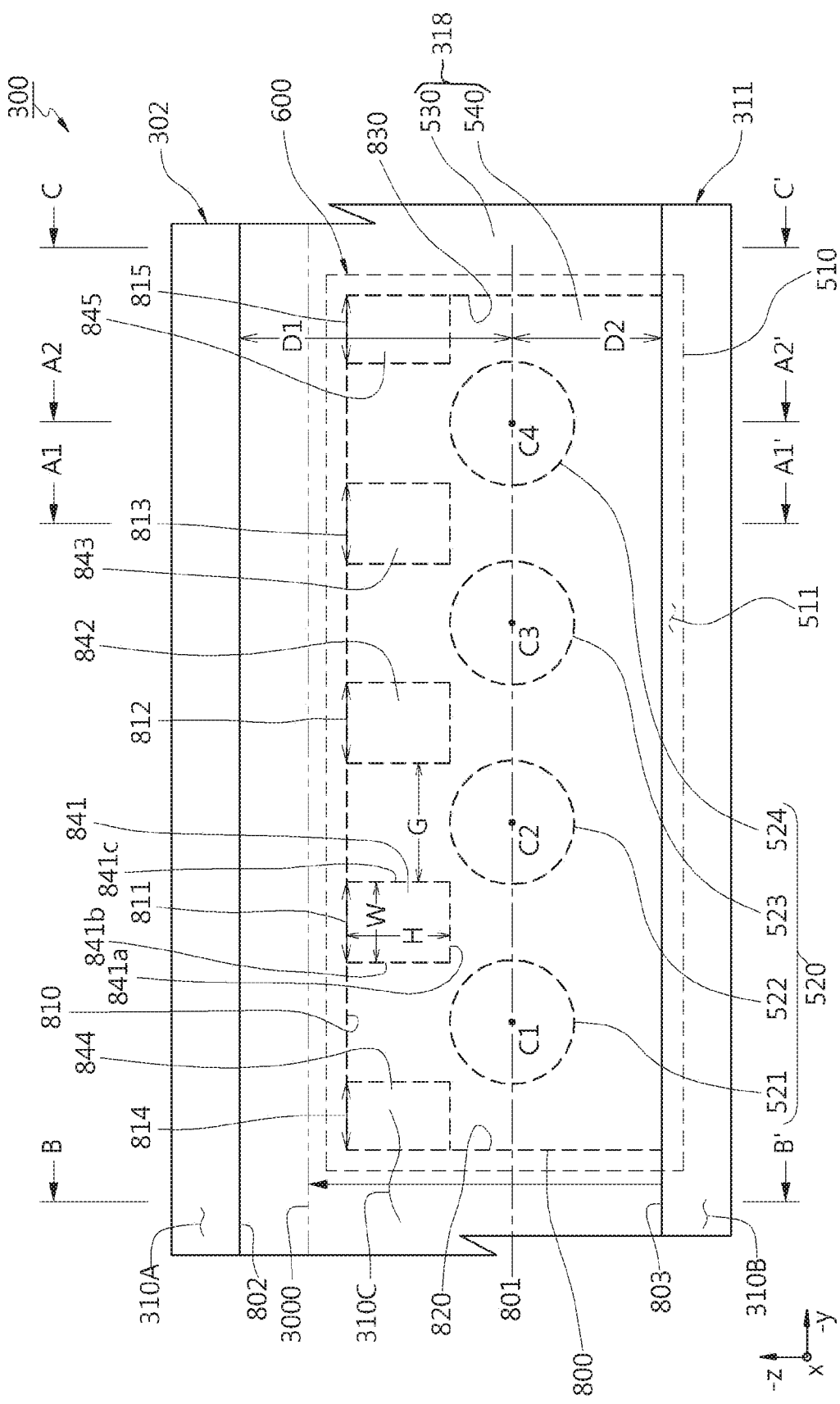
FIG. 8 is a side view illustrating the electronic device of FIG. 5 according to an embodiment of the disclosure.

FIG. 8 is a side view illustrating the electronic device 300 of FIG. 5 according to an embodiment of the disclosure.

Referring to FIG. 8, the electronic device 300 may include the front plate 302 (e.g., the front cover), the rear plate 311 (e.g., the rear cover), the lateral member 318 surrounding a space (not shown) between the front plate 302 and the rear plate 311, and the antenna module 600 disposed in the space.

The lateral member 318 may include the conductive portion 530 and the non-conductive portion 540 combined with the conductive portion 530. The conductive portion 530 may include a notch 800 formed partially therein to deploy the non-conductive portion 540 as a part of the lateral member 318. The notch 800 may have, for example, a recessed shape in a direction (the negative z-axis direction) from the rear plate 311 to the front plate 302. The non-conductive portion 540 may be formed to be combined with the conductive portion 530 through, for example, insert injection. Materials of various colors or textures may be coated on a lateral surface 310C of the lateral member 318, so that a boundary between the conductive portion 530 and the non-conductive portion 540 may be invisible. The rear plate 311 may be extended toward the front plate 302 to cover the notch 800 (see reference numeral 3000).

The first PCB 510 of the antenna module 600 may be disposed such that the first surface 511 faces the non-conductive portion 540. The plurality of antenna elements 521, 522, 523, and 524 disposed on the first surface 511 or near the first surface 511 in the first PCB may be substantially overlapped with the non-conductive portion 540 when viewed toward the first surface 511. A structure that the non-conductive portion 540 is disposed in the notch 800 formed in the conductive portion 530 may reduce the deformation of a beam pattern formed by the antenna array 520 or ensure the coverage.

The plurality of antenna elements 521, 522, 523, and 524 may be arranged in a direction (e.g., the y-axis direction) which is perpendicular to a direction (e.g., the negative z-axis direction) from the rear plate 311 to the front plate 302 and also perpendicular to a direction (e.g., the negative x-axis direction) that the first surface 511 faces. The plurality of antenna elements 521, 522, 523, and 524 may have substantially the same shape and may be arranged at regular intervals. These intervals between the respective adjacent antenna elements 521, 522, 523, and 524 may be irregular.

When viewed toward the first surface 511, each of the antenna elements 521, 522, 523, and 524 may have a symmetrical shape in the direction (e.g., the negative z-axis direction) from the rear plate 311 to the front plate 302 and/or in the direction (e.g., the y-axis direction) where the antenna elements 521, 522, 523, and 524 are arranged. When viewed toward the first surface 511, each of the antenna elements 521, 522, 523, and 524 may have, but is not limited to, a circular shape or any other symmetrical shape (e.g., a square, octagonal, or bow tie shape). Such a symmetrical shape of the antenna element may allow a double polarization to be easily formed through a single feed or multiple feeds.

When viewed toward the first surface 511, a virtual straight line 801 passing through the centers of symmetry C1, C2, C3, and C4 of the plurality of antenna elements 521, 522, 523, and 524 may be disposed between a first boundary 802 between the front surface 310A and the lateral surface 310C and a second boundary 803 between the rear surface 310B and the lateral surface 310C. When viewed toward the first surface 511, a first distance D1 where the virtual straight line 801 is spaced apart from the first boundary 802 may be greater than a second distance D2 where the virtual straight line 801 is spaced apart from the second boundary 803. The first distance D1 and/or the second distance D2 may be implemented differently depending on the position(s) of the first PCB 510 and/or the antenna array 520.

When viewed toward the first surface 511, the notch 800 may have a rectangular shape. For example, the conductive portion 530 may have a third surface 810, a fourth surface 820, and a fifth surface 830, all of which form the notch 800 together. The third surface 810 may face the rear plate 311, and the fourth and fifth surfaces 820 and 830 may be connected to the third surface 810 and disposed opposite to each other.

When viewed toward the first surface 511, the notch 800 may have a shape in which the width in the arrangement direction of the antenna elements 521, 522, 523, and 524 becomes widened as it goes toward the direction from the front plate 302 to the rear plate 311. In this case, the fourth and fifth surfaces 820 and 830 may be implemented as an inclined surface when viewed toward the first surface 511. According to various embodiments of the disclosure, the notch 800 may be formed in various other shapes (not shown) when viewed toward the first surface 511.

When viewed toward the first surface 511, the first surface 511 of the first PCB 510 may overlap at least partially with the notch 800. Considering a structure that the antenna array 520 is overlapped with the non-conductive portion 540 disposed in the notch 800 when viewed toward the first surface 511, the position and/or shape of the first PCB 510 (or the first surface 511) may be varied without not limited to the illustrated example.

When viewed toward the first surface 511, the conductive portion 530 may include a plurality of protrusions 841, 842, 843, 844, and 845 extended from the third surface 810 toward the rear plate 311. The plurality of protrusions 841, 842, 843, 844, and 845 may be arranged in the direction (e.g., the y-axis direction) in which the plurality of antenna elements 521, 522, 523, and 524 are arranged. The plurality of protrusions 841, 842, 843, 844, and 845 may be arranged to be spaced apart from the first surface 511 and/or the plurality of antenna elements 521, 522, 523, and 524 in the negative x-axis direction.

When viewed toward the first surface 511, the plurality of protrusions 841, 842, 843, 844, and 845 may be overlapped with the first surface 511, but may not be substantially overlapped with the plurality of antenna elements 521, 522, 523, and 524.

The plurality of protrusions 841, 842, 843, 844, and 845 may be disposed to be spaced apart from the lateral surface 310C, and the non-conductive portion 540 may be interposed between the lateral surface 310C and the plurality of protrusions 841, 842, 843, 844, and 845.

When viewed toward the first surface 511, the conductive portion 530 may include the first protrusion 841 extended from a first region 811 of the third surface 810, which vertically corresponds to a position between the center C1 of the first antenna element 521 and the center C2 of the second antenna element 522, toward the rear plate 311. When viewed toward the first surface 511, the conductive portion 530 may include the second protrusion 842 extended from a second region 812 of the third surface 810, which vertically corresponds to a position between the center C2 of the second antenna element 522 and the center C3 of the third antenna element 523, toward the rear plate 311. When viewed toward the first surface 511, the conductive portion 530 may include the third protrusion 843 extended from a third region 813 of the third surface 810, which vertically corresponds to a position between the center C3 of the third antenna element 523 and the center C4 of the fourth antenna element 524, toward the rear plate 311.

The first protrusion 841 may have a sixth surface 841a facing the rear plate 311, and seventh and eighth surfaces 841b and 841c which connect the sixth surface 841a and the third surface 810, are perpendicular to the sixth surface 841a, and are disposed opposite to each other. According to various embodiments of the disclosure (not shown), the first protrusion 841 may be formed in any other shape such as, for example, a shape to form an obtuse angle between the sixth surface 841a and the seventh surface 841b or the eighth surface 841c. Each of the second and third protrusions 842 and 843 may have substantially the same shape as the first protrusion 841, so that a description thereof will be omitted.

Then viewed toward the first surface 511, the conductive portion 530 may include the fourth protrusion 844 extended from a fourth region 814 of the third surface 810, which vertically corresponds to a position between the fourth surface 820 of the notch 800 and the center C1 of the first antenna element 521, toward the rear plate 311. The fourth protrusion 844 may be connected to the fourth surface 820 of the notch 800. The fourth protrusion 844 may be positioned to be spaced apart from the fourth surface 820.

When viewed toward the first surface 511, the conductive portion 530 may include the fifth protrusion 845 extended from a fifth region 815 of the third surface 810, which vertically corresponds to a position between the fifth surface 830 of the notch 800 and the center C4 of the fourth antenna element 524, toward the rear plate 311. The fifth protrusion 845 may be connected to the fifth surface 830 of the notch 800. The fifth protrusion 845 may be positioned to be spaced apart from the fifth surface 830.

When viewed toward the first surface 511, each of the plurality of protrusions 841, 842, 843, 844, and 845 may be formed to have a height that does not exceed the virtual straight line 801 passing through the centers of symmetry C1, C2, C3, and C4 of the plurality of antenna elements 521, 522, 523, and 524. The first protrusion 841 may be protruded from the third surface 810 to have a first height (H), and each of the second, third, fourth, and fifth protrusions 842, 843, 844, and 845 may also have the first height. According to another embodiment of the disclosure (not shown), the plurality of protrusions 841, 842, 843, 844, and 845 may have different heights.

When viewed toward the first surface 511, the plurality of protrusions 841, 842, 843, 844, and 845 may be arranged to have substantially the same gap (G) in the direction (e.g., the y-axis direction) where the plurality of antenna elements 521, 522, 523, and 524 are arranged. According to another embodiment of the disclosure (not shown), the plurality of protrusions 841, 842, 843, 844, and 845 may be arranged to have different gaps.

When viewed toward the first surface 511, the first, second, and third protrusions 841, 842, and 843 may have substantially the same width (W) in the direction (e.g., the y-axis direction) where the plurality of antenna elements 521, 522, 523, and 524 are arranged. According to another embodiment of the disclosure (not shown), the first, second, and third protrusions 841, 842, and 843 may have different widths.

When viewed toward the first surface 511, each of the fourth and fifth protrusions 844 and 845 may have a width smaller than the width (W) of the first, second, and third protrusions 841, 842, and 843. The width of each of the fourth and fifth protrusions 844 and 845 may be equal to or greater than the width (W) of the first, second, and third protrusions 841, 842, and 843.

The first protrusion 841 may be composed of a plurality of sub-protrusions extended from the first region 811 of the third surface 810. The plurality of sub-protrusions may be arranged at regular or irregular intervals in the direction (e.g., the y-axis direction) where the plurality of antenna elements 521, 522, 523, and 524 are arranged. The plurality of sub-protrusions may have the same width or different widths in the direction where the plurality of antenna elements 521, 522, 523, and 524 are arranged. The plurality of sub-protrusions may have the same height or different heights in the direction from the front plate 302 to the rear plate 311. Like the first protrusion 841, each of the second, third, fourth, and fifth protrusions 842, 843, 844, and 845 may be composed of a plurality of sub-protrusions.

The plurality of protrusions 841, 842, 843, 844, and 845 may be implemented with a conductive pattern that is separately attached to the third surface 810 of the notch 800. A conductive or a non-conductive bonding material may be interposed between the conductive pattern and the third surface 810. The conductive pattern may be formed of a metallic material which is identical to or different from that of the conductive portion 530 of the lateral member 318. The conductive pattern may have an electrical conductivity which is identical to or different from that of the conductive portion 530 of the lateral member 318.

The plurality of protrusions 841, 842, 843, 844, and 845 may reduce the deformation or distortion of a beam pattern formed by the antenna module 600. The antenna module 600 may have directivity to concentrate electromagnetic energy or transmit/receive radio waves in a specific direction. For example, using the beamforming system, the antenna array 520 may form a beam having energy radiated relatively greatly in a direction that the first surface 511 faces. If the plurality of protrusions 841, 842, 843, 844, and 845 are omitted, at least a part of the electromagnetic field or radio waves from the antenna array 520 may be reflected by the third surface 810, and the reflected component may cause interference (e.g., constructive interference and/or destructive interference) and thereby result in the deformation or distortion of a beam pattern. The plurality of protrusions 841, 842, 843, 844, and 845 may prevent (or reduce) the electromagnetic field or radio waves generated at the antenna array 520 from being reflected by the third surface 810, thereby reducing the deformation or distortion of the beam pattern.

The plurality of protrusions 841, 842, 843, 844, and 845 may generate radio waves using a part of the electromagnetic field or radio waves from the antenna array 520, thereby ensuring or at least compensating for the coverage. The plurality of protrusions 841, 842, 843, 844, and 845 may be operated as an antenna radiator through indirect power feeding from the antenna array 520. For example, the plurality of protrusions 841, 842, 843, 844, and 845 may receive a radiation current indirectly from the antenna array

520. The plurality of protrusions 841, 842, 843, 844, and 845 may generate radio waves using a part of the electromagnetic field or radio waves from the antenna array 520 through a boundary condition established for the electromagnetic field.

The shape (e.g., height (H), width (W), gap (G), or thickness (e.g., in the x-axis direction)) of the plurality of protrusions 841, 842, 843, 844, and 845 may be determined to have a resonant length for a selected or designated frequency with respect to the antenna module 600.

The shape of the plurality of protrusions 841, 842, 843, 844, and 845 may be related to a wavelength suitable for shielding noise associated with a selected or designated frequency with respect to the antenna module 600.

The electromagnetic field from the antenna array 520 may cause capacitance (or a capacitance component or a parasitic capacitance component) at the plurality of protrusions 841, 842, 843, 844, and 845, and a parasitic resonant frequency may be formed due to such capacitance. The shape of the plurality of protrusions 841, 842, 843, 844, and 845 may shift the parasitic resonant frequency out of a resonant frequency band of the antenna array 520 so that the parasitic resonant frequency is not included in the resonant frequency band.

Figure 9B:
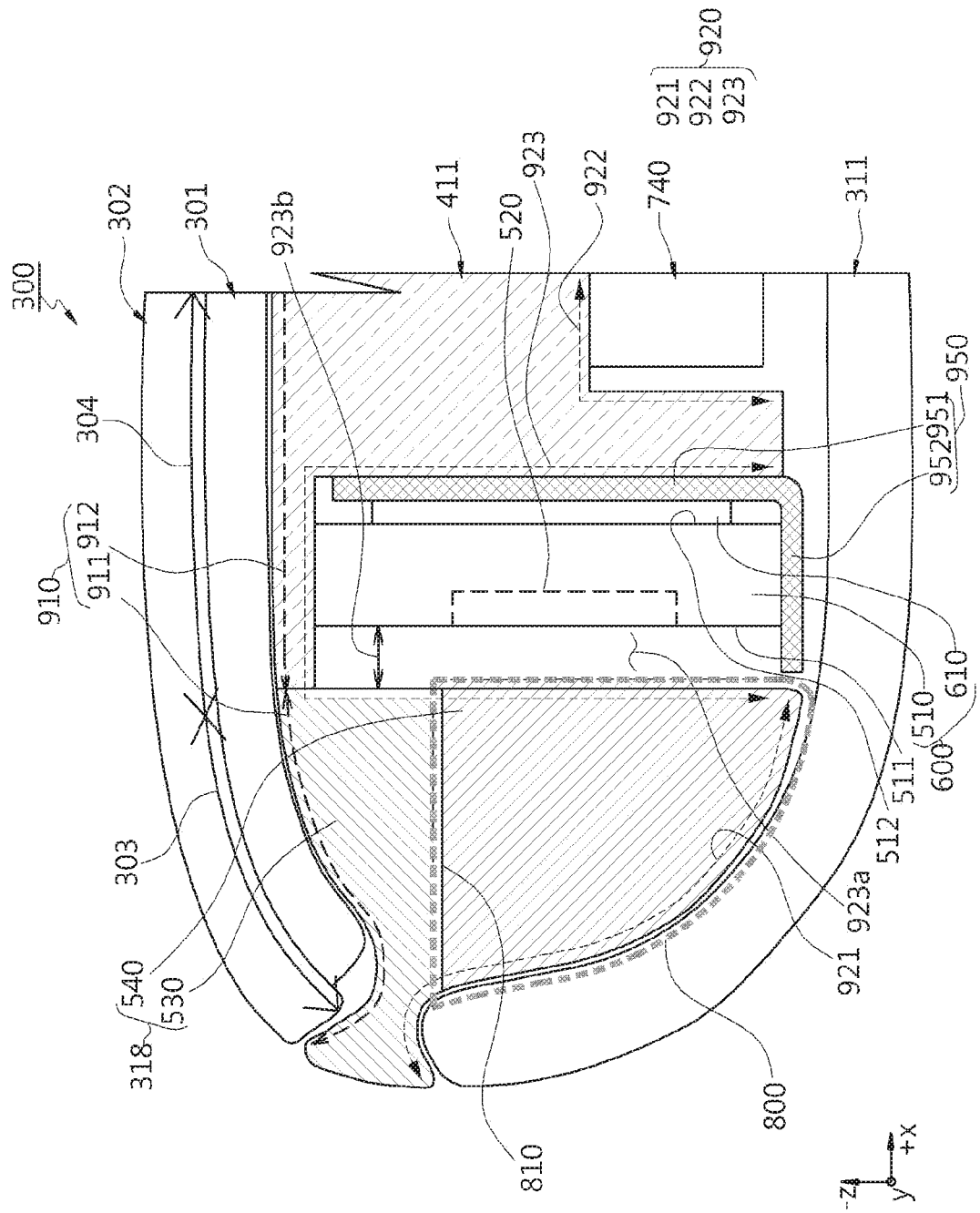
FIG. 9B is a cross-sectional view, taken along the line A2-A2' of FIG. 8, illustrating the electronic device according to an embodiment of the disclosure.

FIG. 9A is a cross-sectional view, taken along the line A1-A1' of FIG. 8, illustrating the electronic device 300 according to an embodiment of the disclosure. FIG. 9B is a cross-sectional view, taken along the line A2-A2' of FIG. 8, illustrating the electronic device 300 according to an embodiment of the disclosure.

FIG. 9A shows a cross-section where there is a protrusion (e.g., the third protrusion 843) extended from the third surface 810 of the notch 800, and FIG. 9B shows a cross-section where there is no protrusion extended from the third surface 810 of the notch 800.

Referring to FIGS. 9A and 9B, the electronic device 300 may include the front plate 302, the rear plate 311, the lateral member 318, the first support member 411, the display 301, the antenna module 600, and/or the second PCB 740 (e.g., the PCB 440 in FIG. 4). Some components of the electronic device 300 may be the same as or similar to those of the electronic device 300 shown in FIG. 3A, FIG. 3B, or FIG. 4, so that descriptions thereof are omitted below.

The lateral member 318 may include the conductive portion 530 and the non-conductive portion 540 combined with each other. The conductive portion 530 may include the notch 800 having a recessed shape in a direction from the rear plate 311 to the front plate 302, and the non-conductive portion 540 may be disposed at least partially in the notch 800. Depending on the presence or absence of the protrusion, the notch 800 and the non-conductive portion 540 disposed in the notch 800 may be depicted in different cross-sectional shapes in FIGS. 9A and 9B.

The first support member 411 may be disposed inside the electronic device 300 and connected to the lateral member 318. The first support member 411 may be integrally formed with the lateral member 318. A structure including the lateral member 318 and the first support member 411 may form a first mounting surface 910 on which the display 301 and the front plate 302 are disposed. The structure including the lateral member 318 and the first support member 411 may have a second mounting surface 920 positioned opposite to the first mounting surface 910. The second PCB 740 and the rear plate 311 may be disposed on the second mounting surface 920.

The first mounting surface 910 may have a first region 911 formed by the conductive portion 530 of the lateral member 318, and a second region 912 formed by the first support member 411. Each of the display 301 and the front plate 302 may include a flat portion 304 and a curved portion 303 extended from the flat portion 304 and bent toward the rear plate 311. At least a part of the curved portion 303 may be disposed in or combined with the first region 911. According to other embodiments of the disclosure (not shown), the curved portion 303 may be modified to have a flat shape.

The second mounting surface 920 may have a third region 921 formed by the lateral member 318, and an edge region of the rear plate 311 (e.g., at least a part of the curved portion) may be disposed in or combined with at least the third region 921. In the cross-sectional view of FIG. 9A for the line A1-A1', the third region 921 may have a first part (not shown) formed by the conductive portion 530, and a second part (not shown) formed by the non-conductive portion 540. In the cross-sectional view of FIG. 9B for the line A2-A2', the third region 921 may be formed by the non-conductive portion 540 disposed in the notch 800. The third region 921 may further have a third part (not shown) formed by the conductive portion 530 outside the notch 800 (e.g., a cross section taken along the line B-B' or the line C-C' in FIG. 8).

The second mounting surface 920 may have a fourth region 922 formed by the first support member 411 and the second PCB 740 may be disposed in or combined with the fourth region 922. The fourth region 922 may form a recess (not shown) for at least partially accommodating the second PCB 740.

The second mounting surface 920 may have a fifth region 923 disposed between the third region 921 (e.g., a region where the edge region of the rear plate 311 is disposed) and the fourth region 922 and formed by both the lateral member 318 and the first support member 411. The antenna module 600 may be disposed in or combined with the fifth region 923. The fifth region 923 may form a recess 923a having a shape recessed in a direction from the rear plate 311 to the front plate 302 to accommodate at least partially the antenna module 600.

The antenna module 600 may include the first PCB 510 on which the antenna array 520 is disposed, and the first wireless communication circuit 610 electrically connected to the antenna array 520. The first PCB 510 may have the first surface 511 disposed to face the lateral member 318, and the second surface 512 disposed opposite the first surface 511. The antenna array 520 may be disposed on the first surface 511 or disposed near the first surface 511 in the first PCB 510. The first wireless communication circuit 610 may be disposed on the second surface 512.

The electronic device 300 may include a conductive support member 950 to which the antenna module 600 is fixed. The conductive support member 950 may include a first support portion 951 facing the second surface 512 of the first PCB 510, and a second support portion 952 extended from the first support portion 951 to the lateral surface of the first PCB 510. The conductive support member 950 may be combined with the lateral member 318 (e.g., the conductive portion 530) or the first support member 411, whereby the first surface 511 may be disposed to face the non-conductive portion 540. Although not shown, the conductive support member 950 may include at least one extension extended from the first support portion 951 or the second support portion 952 and fastened to the lateral member 318 or the first support member 411 through a bolt. The conductive support member 950 may be formed of a metal material such as stainless steel (SUS), copper (Cu), or aluminum (Al), and may operate as a heat spreader for delivering heat, emitted from the antenna module 600, to the lateral member 318 or the first support member 411. The conductive support member 950 may shield noise related to a selected or designated frequency for the antenna module 600.

The first surface 511 of the first PCB 510 may be spaced apart from the lateral member 318 (e.g., the conductive portion 530 and/or the non-conductive portion 540) with a space 923b therebetween. A non-conductive material extended or separate from the non-conductive portion 540 may be disposed or filled in the space 923b.

The non-conductive portion 540 of the lateral member 318 may face substantially the antenna array 520. The notch 800 and the non-conductive portion 540 disposed therein may reduce the effect of the conductive portion 530 of the lateral member 318 on radio waves radiated from the antenna array 520, thereby reducing deformation (or distortion) of the beam pattern or ensuring coverage (or communication range).

At least a part of the conductive portion 530 of the lateral member 318 may be utilized as a support structure (e.g., the first region 911 of the first mounting surface 910) on which the display 301 and the front plate 302 are disposed. The notch 800 combined with the non-conductive portion 540 may have the third surface 810 facing the rear plate 311. At least a part of the third surface 810 may include a flat surface, which may not be parallel to the first surface 511 of the first PCB 510.

The conductive portion 530 of the lateral member 318 may include the third protrusion 843 extended from a part of the third surface 810 toward the rear plate 311 (see FIG. 9A). Like the third protrusion 843, the first, second, fourth, and fifth protrusions 841, 842, 844, and 845 shown in FIG. 8 may also be extended from the third surface 810.

The third surface 810 of the notch 800 may have a first inner surface 816 and a second inner surface 817, which are disposed with the third protrusion 843 (or the plurality of protrusions 841, 842, 843, 844, and 845 in FIG. 8) interposed therebetween. At least a part of the first inner surface 816 may include a substantially planar surface, which may not be parallel to the first surface 511 of the first PCB 510. The first inner surface 816 may be substantially perpendicular to the first surface 511. According to another embodiment of the disclosure, the first inner surface 816 may form an acute angle or an obtuse angle with the first surface 511. At least a part of the first inner surface 816 may include a curved surface. Depending on the position or shape of the third protrusion 843 (or the plurality of protrusions 841, 842, 843, 844, and 845 in FIG. 8), the first inner surface 816 and the second inner surface 817 may be varied in area. The third protrusion 843 (or the plurality of protrusions 841, 842, 843, 844, and 845 in FIG. 8) may be positioned or formed substantially without the second inner surface 817.

The antenna module 600 may have directivity to concentrate electromagnetic energy or transmit/receive radio waves in a specific direction. For example, using the beamforming system, the antenna module 600 may form a beam pattern in which beams formed by the plurality of antenna elements (e.g., the first, second, third, and fourth antenna elements 521, 522, 523, and 524 in FIG. 8) of the antenna array 520 are combined. The beam pattern is an effective area in which the antenna array 520 can radiate or detect electromagnetic waves, and may be formed by combining radiant powers of the plurality of antenna elements of the antenna array 520. If the protrusion 843 is omitted, the energy radiated in the third direction (③) (e.g., a direction between the negative x-axis direction and the negative z-axis direction) from the antenna array 520 of the antenna module 600 may be reflected by the first inner surface 816 in the seventh direction (⑦) (e.g., a direction between the negative x-axis direction and the z-axis direction).

The reflected energy may affect the energy radiated in the first direction (①) (e.g., the negative x-axis direction) or the second direction (②) (e.g., a direction between the negative x-axis direction and the z-axis direction), thereby degrading the radiation performance of the antenna module 600. For example, the energy radiated in the first direction (①) and/or the energy radiated in the second direction (②) may be combined with the reflected energy and thereby canceled. The antenna radiation characteristics of the antenna module 600 may include, for example, an antenna radiation pattern or beam pattern, which is a directional function representing a relative distribution of power radiated from the plurality of antenna elements (e.g., the first, second, third, and fourth antenna elements 521, 522, 523, and 524 in FIG. 8), and a polarization state or antenna polarization of electromagnetic waves radiated from the plurality of antenna elements.

If the plurality of protrusions 841, 842, 843, 844, and 845 shown in FIG. 8 are omitted, the antenna module 600 may have difficulty in having antenna radiation characteristics corresponding to a selected or designated frequency, and thus antenna performance may be degraded. For example, if the plurality of protrusions 841, 842, 843, 844, and 845 shown in FIG. 8 are omitted, the third surface 810 of the notch 800 may shield or interfere with the progress of energy (or radio waves) radiated in the third direction (③), and it may be therefore difficult to ensure coverage in the negative x-axis direction, in a direction between the negative x-axis direction and the z-axis direction, and/or a direction between the negative x-axis direction and the negative z-axis direction. For example, if the plurality of protrusions 841, 842, 843, 844, and 845 shown in FIG. 8 are omitted, the energy radiated in the third direction (③) may be reflected in the seventh direction (⑦) by the third surface 810 of the notch 800, and thus the reflected component (e.g., disturbance waves) may cause the deformation or distortion of the beam pattern through interference (e.g., constructive interference and/or destructive interference) in energy radiated in the first direction (①) and/or energy radiated in the second direction (②). The deformation or distortion of the beam pattern may include, for example, the formation of a null between lobes. The null may include a cancelation phenomenon caused by radio waves having different phases because a phase difference between a radio wave radiated directly from the antenna module 600 and a radio wave reflected by the third surface 810 increases (e.g., delay to 180 degrees) or decreases. The null may indicate an ineffective area in which the antenna array 520 cannot radiate or detect radio waves. The null may indicate a direction having the radiation intensity of being substantially zero.

The radio waves radiated from the antenna array 520 may include a horizontal polarization and a vertical polarization as a dual polarization. The horizontal polarization is a linear polarization in which the vector direction of the electric field is horizontal, and the electric field vector of the horizontal polarization may be parallel to a ground plane (e.g., a ground plane parallel to the y-z plane) included in the first PCB 510. The vertical polarization is a linear polarization in which the vector direction of the electric field is vertical, and the electric field vector of the vertical polarization may be perpendicular to the ground plane included in the first PCB 510. The plurality of antenna elements of the antenna array 520 (e.g., the first, second, third, and fourth antenna elements 521, 522, 523, and 524 in FIG. 8) may form the horizontal polarization and the vertical polarization through single or multi power feeding. The position and/or number of power feeders for the plurality of antenna elements of the antenna array 520 may be variously implemented depending on the antenna radiation characteristics.

Figure 10:
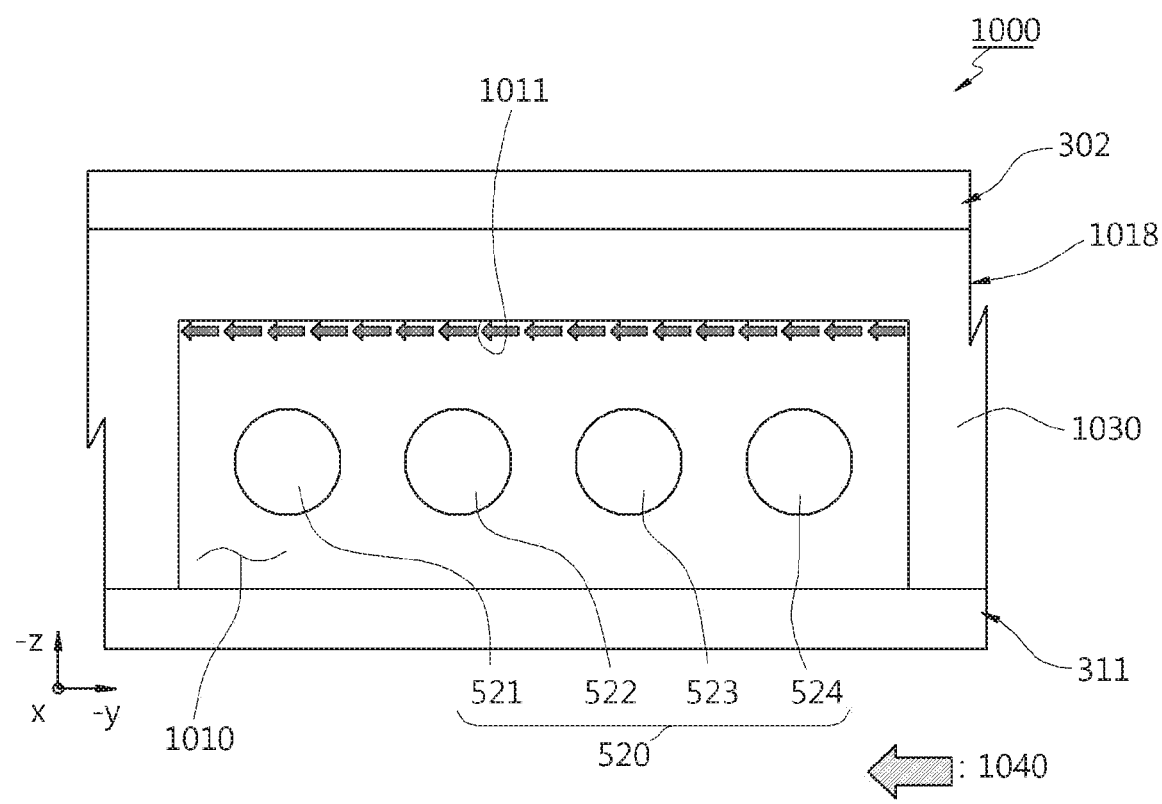
FIG. 10 is a view illustrating a current flow in an electronic device having a notch without a plurality of protrusions according to an embodiment of the disclosure.

FIG. 10 is a view illustrating a current flow in an electronic device 1000 having a notch without a plurality of protrusions according to an embodiment of the disclosure. Some components of the electronic device 1000 may be substantially the same as those of the electronic device 300 shown in FIG. 8, and be denoted by the same reference numerals.

Referring to FIG. 10, when radio waves radiated from the antenna array 520 meet a third surface 1011 of a notch 1010 formed in a conductive portion 1030 of a lateral member 1018, reflection (e.g., total reflection) may occur. This may cause a surface current 1040 in the form of an alternating current (AC) excited at and flowing along the third surface 1011. When the radio waves meet the third surface 1011 which conducts electricity well, substantially whole energy may be changed into a current flowing on a conductor surface. The surface current 1040 in the form of AC may generate radio waves (e.g., energy reflected in the seventh direction (⑦) in FIG. 9A) according to a change in current.

Referring to FIGS. 8 and 9A, the energy reflected in the seventh direction (⑦) by the third surface 810 may be reduced due to the plurality of protrusions 841, 842, 843, 844, and 845, so that interference in energy radiated in the first direction (①) and/or energy radiated in the second direction (②) may be reduced. For example, the third protrusion 843 may have a third inner surface 818 spaced apart from the first surface 511 of the first PCB 510. Similarly, each of the first, second, fourth, and fifth protrusions 841, 842, 844, and 845 in FIG. 8 may also have a third inner surface. The third inner surface 818 may be substantially planar, and may form a certain angle with the first inner surface 816 which is another part of the third surface 810. For example, the angle between the third inner surface 818 and the first inner surface 816 may be a right angle, an obtuse angle, or an acute angle. When meeting a structure composed of the first inner surface 816 and the third inner surface 818, at least a part of the energy radiated in the third direction (③) may be scattered (e.g., diffused reflection of energy). Thus, the energy reflected in the seventh direction (⑦) may be reduced. The structure composed of the first inner surface 816 and the third inner surface 818 may alternatively be implemented in various other forms for reducing the energy reflected in the seventh direction (⑦). For example, a corner between the first inner surface 816 and the third inner surface 818 may form a seamlessly curved shape. For another example, the first inner surface 816 and/or the third inner surface 818 may be embodied in a curved surface, an uneven surface, or any other form.

Referring to FIGS. 8 and 9A, the plurality of protrusions 841, 842, 843, 844, and 845 may emit radio waves using at least a part of energy radiated in the third direction (③), thereby ensuring or at least compensating for coverage. The plurality of protrusions 841, 842, 843, 844, and 845 have a boundary condition changed for the electromagnetic field, as compared to FIG. 10, and are capable of generating radio waves based on at least a part of energy radiated in the third direction (③). For example, based on the at least a part of the energy radiated in the third direction (③), the plurality of protrusions 841, 842, 843, 844, and 845 may form energy radiated in the fourth direction (④), energy radiated in the fifth direction (⑤), and/or energy radiated in the sixth direction (⑥). The energy radiated in the fourth direction (④) may ensure coverage for a corresponding angle range in the negative x-axis direction. The energy radiated in the fifth direction (⑤) may ensure coverage for a corresponding angle range in a direction between the negative x-axis direction and the z-axis direction. The energy radiated in the sixth direction (⑥) may ensure coverage for a corresponding angle range in a direction between the negative x-axis direction and the negative z-axis direction. The radiation of the plurality of protrusions 841, 842, 843, 844, and 845 will be described below with reference to FIG. 11.

Figure 11:
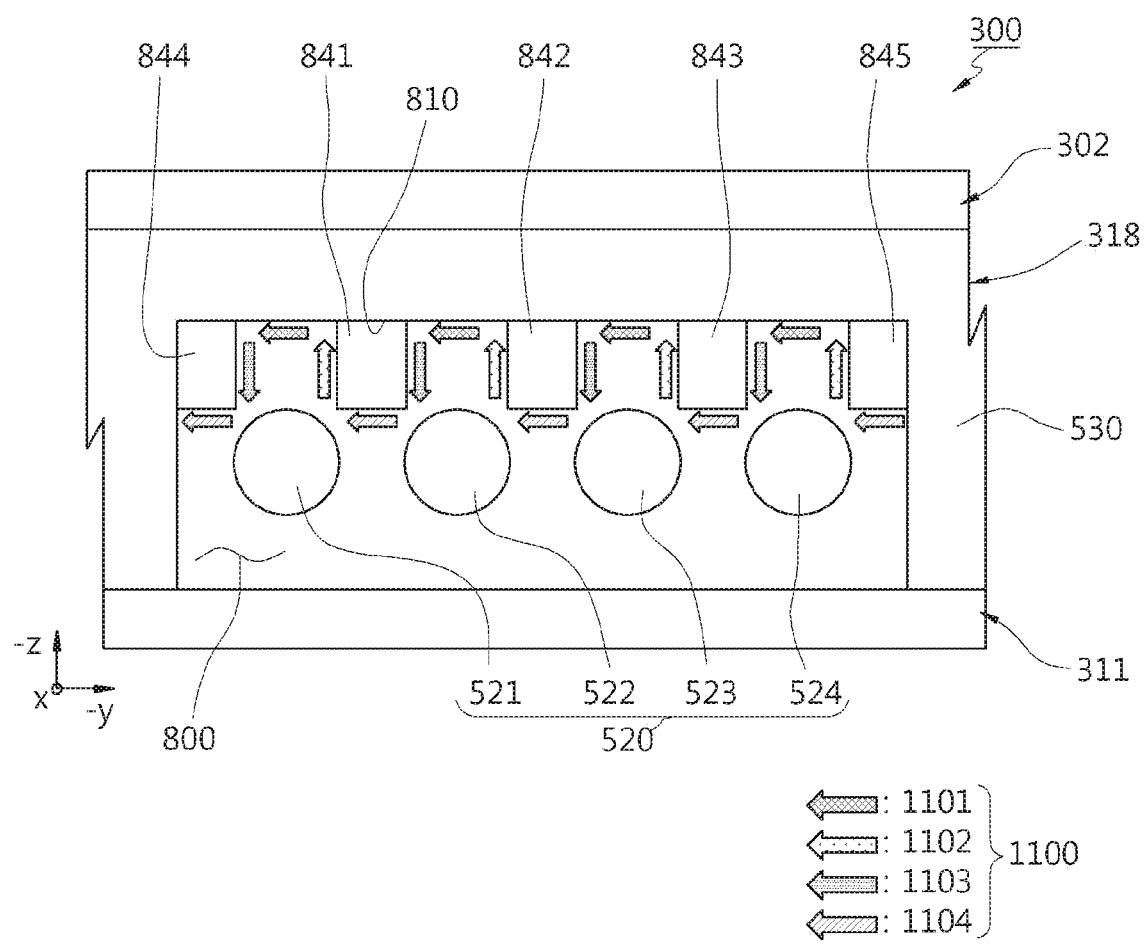
FIG. 11 is a view illustrating a current flow in an electronic device having a notch with a plurality of protrusions according to an embodiment of the disclosure.

FIG. 11 is a view illustrating a current flow in an electronic device 300 having a notch with a plurality of protrusions according to an embodiment of the disclosure. Components having the same reference numerals described with reference to FIG. 8 are not described repeatedly.

Referring to FIG. 11, when the electromagnetic field (e.g., energy radiated in the third direction (③) of FIG. 9A) formed from the antenna array 520 is applied to the notch 800 including the plurality of protrusions 841, 842, 843, 844, and 845 formed in the conductive portion 530, a surface current 1100 in the form of AC may be excited and flow. According to an embodiment, compared to FIG. 10, the boundary condition for the electromagnetic field may be changed because of the plurality of protrusions 841, 842, 843, 844, and 845. Depending on the boundary condition, the surface current 1100 may include, for example, a first current component 1101 flowing along the third surface 810 between the adjacent protrusions 841, 842, 843, 844, and 845, and second, third, and fourth current components 1102, 1103, and 1104 flowing along surfaces of the protrusions 841, 842, 843, 844, and 845. The first and fourth current components 1101 and 1104 may flow in substantially the same direction. The second and third current components 1102 and 1103 may flow in opposite directions. The first current component 1101 may emit a first wave energy according to a change in current. The second current component 1102 may emit a second wave energy according to a change in current. The third current component 1103 may emit a third wave energy according to a change in current. The fourth current component 1104 may emit a fourth wave energy according to a change in current. When the first, second, third, and fourth wave energies are synthesized, radio waves emitted in the fourth direction (④), radio waves emitted in the fifth direction (⑤), and/or radio waves emitted in the sixth direction (⑥) shown in FIG. 9A may be formed. The first, second, third, and fourth wave energies may be synthesized through constructive interference and/or destructive interference depending on the phase of the current.

The radio waves that the plurality of protrusions 841, 842, 843, 844, and 845 of FIG. 8 generate using at least a part of the electromagnetic field formed from the antenna array 520 may include a horizontal polarization and/or a vertical polarization.

Referring to FIG. 8, the conductive portion 530 may include at least one protrusion (not shown) extended from the fourth surface 820 of the notch 800 in a direction from the fourth surface 820 to the fifth surface 830. The conductive portion 530 may include at least one protrusion (not shown) extended from the fifth surface 830 of the notch 800 in a direction from the fifth surface 830 to the fourth surface 820. Like the plurality of protrusions 841, 842, 843, 844, and 845 in FIG. 8, the protrusion extended from the fourth surface 820 or the fifth surface 830 may reduce the deformation (or distortion) of the beam pattern formed by the antenna array 520, and/or assist ensuring coverage by emitting radio waves using at least a part of the electromagnetic field formed from the antenna array 520.

Referring to FIG. 9A, a distance D3 at which the protrusion 843 (or each of the plurality of protrusions 841, 842, 843, 844, and 845 in FIG. 8) is spaced apart from the first surface 511 or the antenna array 520 in a direction that the first surface 511 of the first PCB 510 faces may be formed to have a resonant length with respect to a selected or designated frequency (e.g., a carrier frequency) to be used for the antenna module 600 to transmit a communication signal. The distance D3 may be determined to be about λ/2 or more with respect to the selected or designated frequency, wherein λ indicates wavelength of beam emitted by the antenna module.

The first PCB 510 may be disposed substantially in parallel with the second PCB 740. For example, the first PCB 510 may be interposed between the rear plate 311 and the second PCB 740. For example, the first PCB 510 may be disposed such that the first surface 511 faces the rear plate 311 near the lateral member 318. Even when the first PCB 510 is disposed in parallel with the second PCB 740, the beamforming system may form a beam having relatively great energy radiated in a lateral direction (e.g., a direction toward the lateral member 318) by adjusting the phase of a current supplied to the plurality of antenna elements 521, 522, 523, and 524 shown in FIG. 8. A second antenna array (not shown) may be added to the first PCB 510, and in a structure where the first PCB 510 is disposed in parallel with the second PCB 740, the beamforming system may form a beam (e.g., a broadside type beam) in a direction of the first surface 511 through the antenna array 520 (e.g., a patch antenna) and also form a beam (e.g., an endfire type beam) in the lateral direction through the second antenna array (e.g., a dipole antenna). Even in the structure where the first PCB 510 is disposed in parallel with the second PCB 740, the non-conductive portion 540 may make it possible to reduce deformation (or distortion) of the beam formed in the lateral direction or ensure coverage. In the structure where the first PCB 510 is disposed in parallel with the second PCB 740, the plurality of protrusions 841, 842, 843, 844, and 845 may generate radio waves using the electromagnetic field or radio waves from the antenna array, thereby ensuring or at least compensating for coverage.

Figure 12:
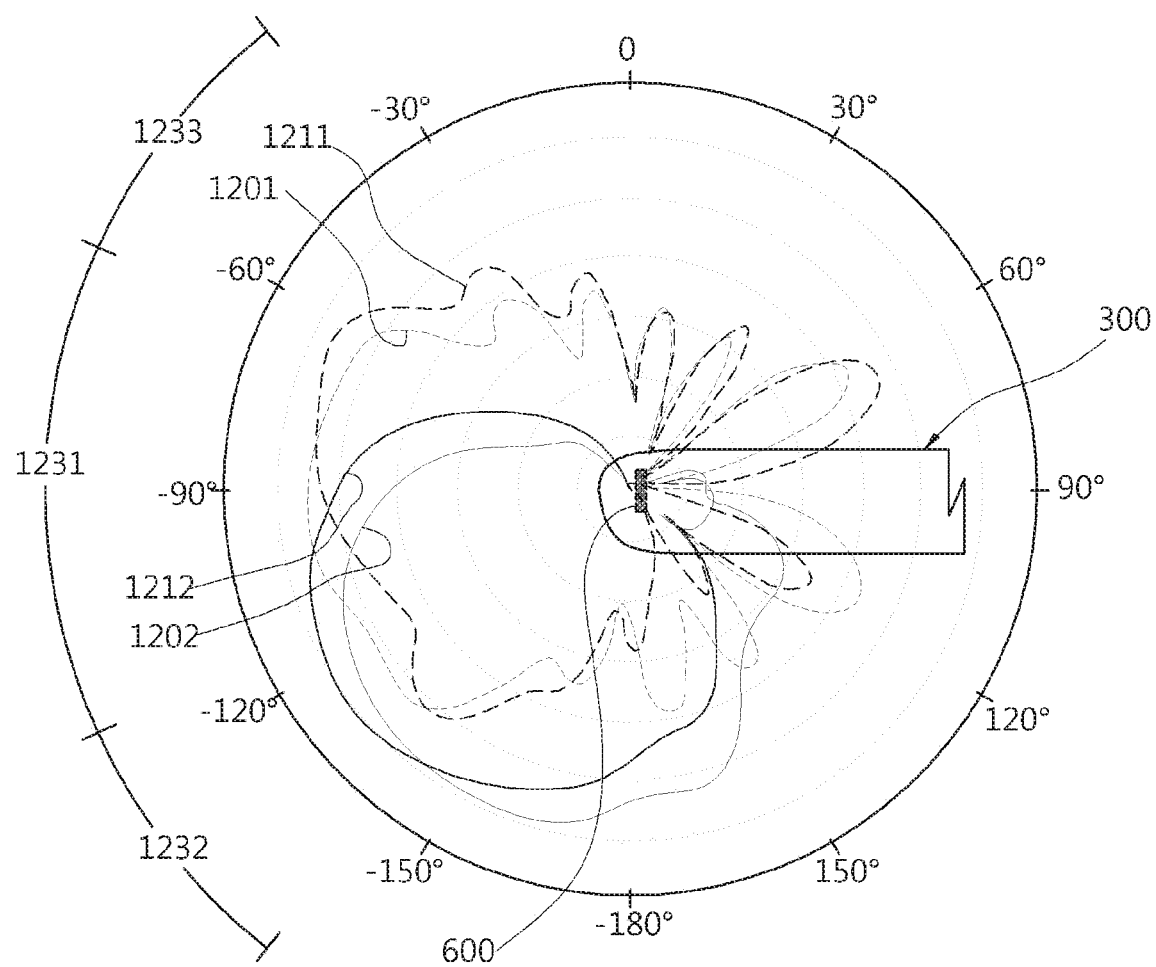
FIG. 12 shows a beam pattern in the electronic device of FIG. 10 and a beam pattern in the electronic device of FIG. 11 according to an embodiment of the disclosure.

FIG. 12 shows a beam pattern in the electronic device 1000 of FIG. 10 and a beam pattern in the electronic device 300 of FIG. 11.

Referring to FIGS. 10 and 12, reference numerals 1201 and 1202 indicate a beam pattern for vertical polarization and a beam pattern for horizontal polarization, respectively, in case of the electronic device 1000 to which the notch 1010 having no protrusion is applied. Referring to FIGS. 11 and 12, reference numerals 1211 and 1212 indicate a beam pattern for vertical polarization and a beam pattern for horizontal polarization, respectively, in case of the electronic device 300 to which the notch 800 having the plurality of protrusions 841, 842, 843, 844, and 845 is applied. According to an embodiment, the antenna module 600 may form beams for coverage with respect to an angular range established in the lateral direction of the electronic device 300. For example, the antenna module 600 may form a second beam pattern for a second coverage 1232 in a lower lateral direction of the electronic device 300. In addition, the antenna module 600 may form a third beam pattern for a third coverage 1233 in an upper lateral direction of the electronic device 300. In addition, the antenna module 600 may form a first beam pattern for a first coverage 1231 between the second coverage 1232 and the third coverage 1233. Comparing the reference numerals 1201 and 1211, or 1202 and 1212, the plurality of protrusions 841, 842, 843, 844, and 845 may reduce the influence of radio waves of the third beam pattern, reflected by the notch surface (e.g., the first inner surface 816 in FIG. 9A), on the first beam pattern and/or the second beam pattern, thereby ensuring the first coverage 1231 and/or the second coverage 1232. Also, comparing the reference numerals 1201 and 1211, or 1202 and 1212, the plurality of protrusions 841, 842, 843, 844, and 845 may generate other radio waves by using radio waves of the third beam pattern, and the generated radio waves may ensure the third coverage 1233.

In the electronic device 1000 of FIG. 10 from which the protrusions are omitted, the first beam pattern for the first coverage 1231 and/or the second beam pattern for the second coverage 1232 may be deformed or distorted due to radio wave reflection on the third surface 1011 of the notch 1010. Due to radio wave blocking on the third surface 1011 of the notch 1010, the electronic device 1000 of FIG. 10 may have difficulty in ensuring the third coverage 1233 in comparison with the electronic device 300 of FIG. 11.

Figure 13A:
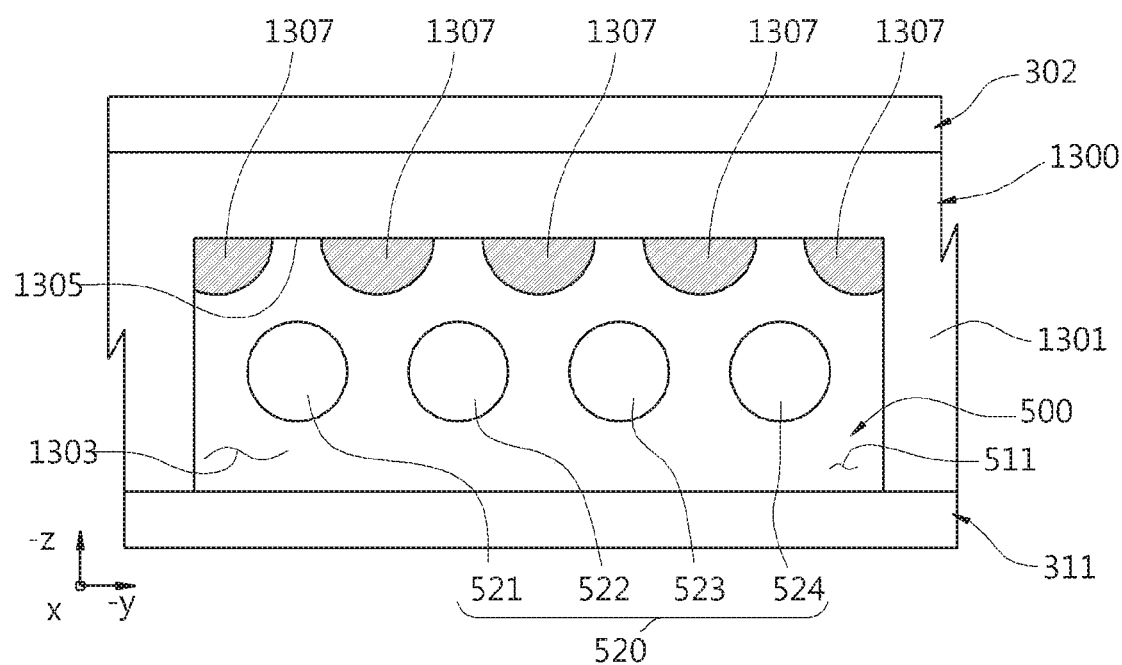
FIGS. 13A, 13B, and 13C are views illustrating a notch including a plurality of protrusions according to various embodiments of the disclosure.
Figure 13B:
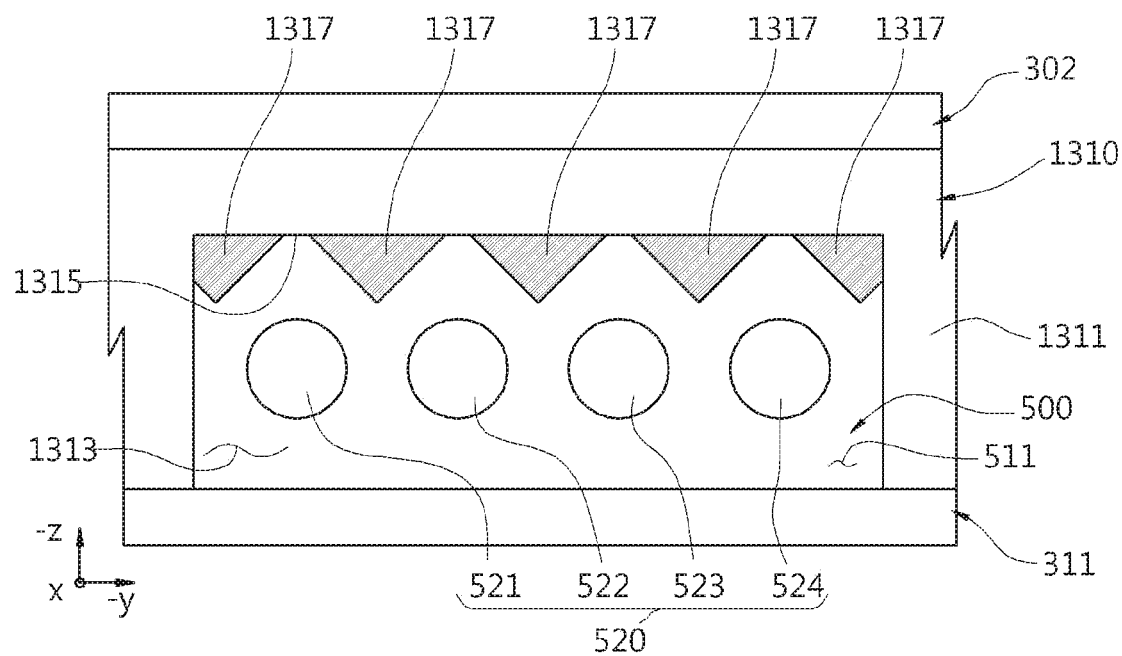
Figure 13C:
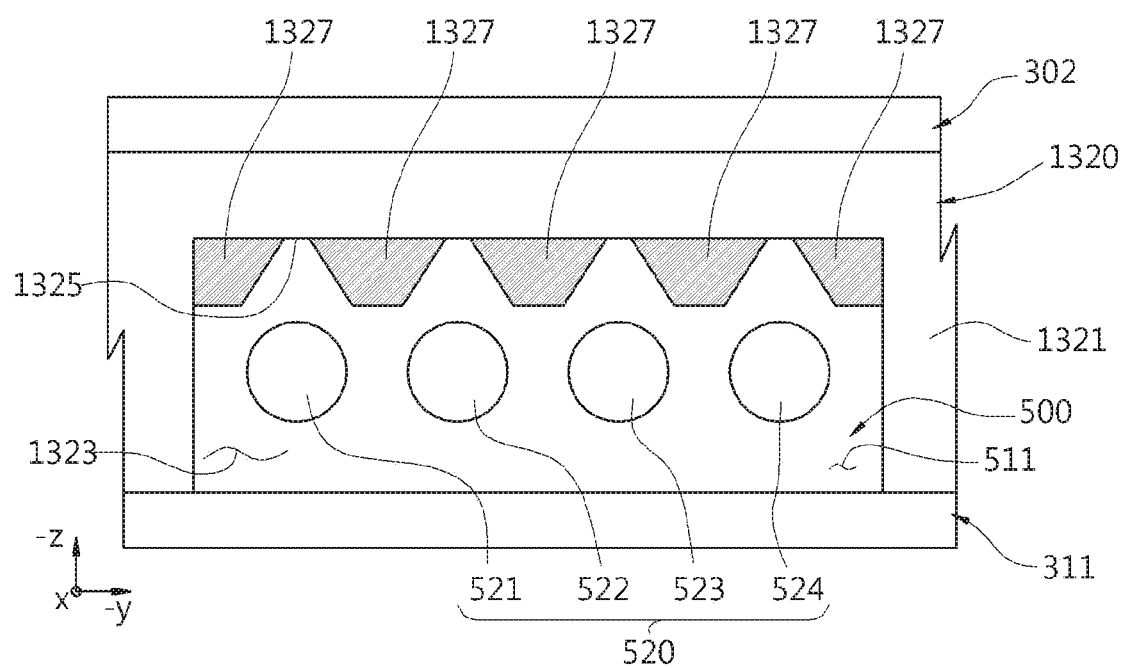

FIGS. 13A, 13B, and 13C are views illustrating a notch including a plurality of protrusions according to various embodiments of the disclosure. The plurality of protrusions 841, 842, 843, 844, and 845 shown in FIG. 8 may be modified in various other forms. Some components of an electronic device shown in FIGS. 13A, 13B, and 13C may be substantially the same as those of the electronic device 300 shown in FIG. 8, and may be denoted by the same reference numerals.

Referring to FIG. 13A a plurality of protrusions 1307 extended from a third surface 1305 of a notch 1303 formed in a conductive portion 1301 of a lateral member 1300 may be implemented in at least a round shape when viewed toward the first surface 511 of the antenna structure 500.

Referring to FIG. 13B, in another example, a plurality of protrusions 1317 extended from a third surface 1315 of a notch 1313 formed in a conductive portion 1311 of a lateral member 1310 may be implemented in at least a triangular shape when viewed toward the first surface 511 of the antenna structure 500.

Referring to FIG. 13C, in another example, a plurality of protrusions 1327 extended from a third surface 1325 of a notch 1323 formed in a conductive portion 1321 of a lateral member 1320 may be implemented at least in a trapezoidal shape when viewed toward the first surface 511 of the antenna structure 500.

Like the plurality of protrusions 841, 842, 843, 844, and 845 shown in FIG. 8, the protrusions 1307, 1317, and 1327 may reduce the deformation (or distortion) of a beam pattern formed by the antenna structure 500, and/or assist ensuring coverage by emitting radio waves using at least a part of the electromagnetic field formed from the antenna structure 500. According to various embodiments, the plurality of protrusions may be implemented in various other forms.

According to an embodiment of the disclosure, an electronic device (e.g., the electronic device 300 in FIG. 8) may include a housing (e.g., the housing 310 in FIG. 3A) and an antenna module (e.g., the antenna module 600 in FIG. 8). The housing may include a front plate (e.g., the front plate 302 in FIG. 8), a rear plate (e.g., the rear plate 311 in FIG. 8) disposed opposite the front plate, and a lateral member (e.g., the lateral member 318 in FIG. 8) surrounding a space between the front plate and the rear plate and including a conductive portion (e.g., the conductive portion 530 in FIG. 8) and a non-conductive portion (e.g., the non-conductive portion 540 in FIG. 8). The antenna module may be disposed in the space and include a printed circuit board (PCB) (e.g., the first PCB 510 in FIG. 9A) and at least one antenna element (e.g., the plurality of antenna elements 521, 522, 523, and 524 in FIG. 8). The PCB may have a first surface (e.g., the first surface 511 in FIG. 9A) disposed to face the lateral member in the space, and a second surface (e.g., the second surface 512 in FIG. 9A) disposed opposite the first surface. The at least one antenna element may be disposed on the first surface or near the first surface in the PCB, and form a beam pattern toward the lateral member. The conductive portion may include, when viewed toward the first surface, a notch (e.g., the notch 800 in FIG. 8) having a recessed shape in a direction from the rear plate to the front plate. The non-conductive portion may be disposed at least partially in the notch and faces substantially the at least one antenna element. The notch may have a third surface (e.g., the third surface 810 in FIG. 8 or FIG. 9A) facing substantially the rear plate. The conductive portion may include at least one protrusion (e.g., the plurality of protrusions 841, 842, 843, 844, and 845 in FIG. 8) extended from a part of the third surface toward the rear plate and spaced apart from the first surface.

According to an embodiment of the disclosure, the third surface (e.g., the third surface 810 in FIG. 9A) may be disposed closer to the front plate (e.g., the front plate 302 in FIG. 9a) than the at least one antenna element (e.g., the antenna array 520 in FIG. 9A) when viewed toward the first surface (e.g., the first surface 511 in FIG. 9A). The third surface may have a region (e.g., the first inner surface 816 in FIG. 9A) disposed between the at least one protrusion (e.g., the third protrusion 843 in FIG. 9A) and the first surface and being not in parallel with the first surface.

According to an embodiment of the disclosure, when viewed toward the first surface (e.g., the first surface 511 in FIG. 8), the at least one protrusion (e.g., the plurality of protrusions 841, 842, 843, 844, and 845 in FIG. 8) may be not overlapped with the at least one antenna element (e.g., the antenna array 520 in FIG. 8).

According to an embodiment of the disclosure, the at least one antenna element may include an antenna array (e.g., the antenna array 520 in FIG. 8) having a plurality of antenna elements (e.g., the plurality of antenna elements 521, 522, 523, and 524 in FIG. 8) arranged in a third direction which is perpendicular to a first direction from the front plate (e.g., the front plate 302 in FIG. 8) to the rear plate (e.g., the rear plate 311 in FIG. 8) and is perpendicular to a second direction that the first surface (e.g., the first surface 511 in FIG. 8) faces.

According to an embodiment of the disclosure, the plurality of antenna elements (e.g., the plurality of antenna elements 521, 522, 523, and 524 in FIG. 6A or FIG. 7) may include a patch antenna.

According to an embodiment of the disclosure, when viewed toward the first surface (e.g., the first surface 511 in FIG. 8), each of the plurality of antenna elements (e.g., the plurality of antenna elements 521, 522, 523, and 524 in FIG. 8) may have a symmetrical shape in the first direction (e.g., the direction from the front plate 302 to the rear plate 311 in FIG. 8) and/or the third direction (e.g., the direction where the plurality of antenna elements 521, 522, 523, and 524 are arranged).

According to an embodiment of the disclosure, when viewed toward the first surface (e.g., the first surface 511 in FIG. 8), the at least one protrusion (e.g., the plurality of protrusions 841, 842, 843, 844, and 845 in FIG. 8) may be extended toward the rear plate (e.g., the rear plate 311 in FIG. 8) from at least the part of the third surface (e.g., the third surface 810 in FIG. 8) corresponding to a position between centers of symmetry (e.g., the centers of symmetry C1, C2, C3, and C4 in FIG. 8) of the plurality of antenna elements.

According to an embodiment of the disclosure, when viewed toward the first surface (e.g., the first surface 511 in FIG. 8), the at least one protrusion (e.g., the plurality of protrusions 841, 842, 843, 844, and 845 in FIG. 8) may be formed to have a height that does not exceed a virtual straight line (e.g., the virtual straight line 801 in FIG. 8) passing through centers of symmetry of the plurality of antenna elements.

According to an embodiment of the disclosure, the at least one protrusion may include a plurality of protrusions (e.g., the plurality of protrusions 841, 842, 843, 844, and 845 in FIG. 8) protruded at a same height in the first direction (e.g., the direction from the front plate 302 to the rear plate 311 in FIG. 8).

According to an embodiment of the disclosure, wherein the at least one protrusion may include a plurality of protrusions (e.g., the plurality of protrusions 841, 842, 843, 844, and 845 in FIG. 8) arranged at regular intervals in the third direction (e.g., the direction where the plurality of antenna elements 521, 522, 523, and 524 are arranged).

According to an embodiment of the disclosure, the at least one protrusion (e.g., the plurality of protrusions 841, 842, 843, 844, and 845 in FIG. 8) may be spaced apart from the first surface (e.g., the first surface 511 in FIG. 5A) by λ/2 or more in a direction that the first surface faces.

According to an embodiment of the disclosure, the at least one protrusion (e.g., the plurality of protrusions 841, 842, 843, 844, and 845 in FIG. 8) may include a conductive pattern attached to the third surface (e.g., the third surface 810 in FIG. 8).

According to an embodiment of the disclosure, the antenna module (e.g., the antenna module 600 in FIG. 9A) may further include a wireless communication circuit (e.g., the first wireless communication circuit 610 in FIG. 9A) disposed on the second surface (e.g., the second surface 512 in FIG. 9A) and electrically connected to the at least one antenna element (e.g., the antenna array 520 in FIG. 9A).

According to an embodiment of the disclosure, the wireless communication circuit (e.g., the first wireless communication circuit 610 in FIG. 9A) may be configured to transmit and/or receive, through the at least one antenna element (e.g., the antenna array 520 in FIG. 9A), a signal of a specific frequency band which is at least a part ranging from about 6 GHz to about 100 GHz.

According to an embodiment of the disclosure, the non-conductive portion (e.g., the non-conductive portion 540 in FIG. 9A) may form a lateral surface (e.g., the lateral surface 310C in FIG. 8) of the electronic device together with the conductive portion (e.g., the conductive portion 530 in FIG. 9A).

According to an embodiment of the disclosure, an electronic device (e.g., the electronic device 300 in FIG. 8) may include a housing (e.g., the housing 310 in FIG. 3A) and an antenna module (e.g., the antenna module 600 in FIG. 6A or FIG. 7). The housing may include a front plate (e.g., the front plate 302 in FIG. 8), a rear plate (e.g., the rear plate 311 in FIG. 8) disposed opposite the front plate, and a lateral member (e.g., the lateral member 318 in FIG. 8) surrounding a space between the front plate and the rear plate and including a conductive portion (e.g., the conductive portion 530 in FIG. 8) and a non-conductive portion (e.g., the non-conductive portion 540 in FIG. 8). The antenna module may be disposed in the space and include a printed circuit board (PCB) (e.g., the first PCB 510 in FIG. 9A) and an antenna array (e.g., the antenna array 520 in FIG. 6A or FIG. 7). The PCB may have a first surface (e.g., the first surface 511 in FIG. 9A) disposed to face the lateral member in the space, and a second surface (e.g., the second surface 512 in FIG. 9A) disposed opposite the first surface. The antenna array may include a plurality of antenna elements (e.g., the plurality of antenna elements 521, 522, 523, and 524 in FIG. 6A or FIG. 7) disposed on the first surface or near the first surface in the PCB, and form a beam pattern toward the lateral member. The electronic device may further include a wireless communication circuit (e.g., the first wireless communication circuit 610 in FIG. 6B, FIG. 7, or FIG. 9A) disposed on the second surface, electrically connected to the antenna array, and configured to transmit and/or receive, through the antenna array, a signal of a specific frequency band which is at least a part ranging from about 6 GHz to about 100 GHz. The conductive portion may include, when viewed toward the first surface, a notch (e.g., the notch 800 in FIG. 8) having a recessed shape in a direction from the rear plate to the front plate. The non-conductive portion may be disposed at least partially in the notch and faces substantially the plurality of antenna elements. The notch may have a third surface (e.g., the third surface 810 in FIG. 8 or FIG. 9A) facing substantially the rear plate and disposed closer to the front plate than the antenna array when viewed toward the first surface. The conductive portion may include a plurality of protrusions (e.g., the plurality of protrusions 841, 842, 843, 844, and 845 in FIG. 8) extended from a part of the third surface toward the rear plate, spaced apart from the first surface, and not overlapped with the plurality of antenna elements when viewed toward the first surface.

According to an embodiment of the disclosure, the third surface (e.g., the third surface 810 in FIG. 9A) may have a region (e.g., the first inner surface 816 in FIG. 9A) disposed between each of the plurality of protrusions (e.g., the plurality of protrusions 841, 842, 843, 844, and 845 in FIG. 8) and the first surface and being not in parallel with the first surface.

According to an embodiment of the disclosure, the plurality of antenna elements (e.g., the plurality of antenna elements 521, 522, 523, and 524 in FIG. 8) may be arranged in a third direction which is perpendicular to a first direction from the front plate (e.g., the front plate 302 in FIG. 8) to the rear plate (e.g., the rear plate 311 in FIG. 8) and is perpendicular to a second direction that the first surface (e.g., the first surface 511 in FIG. 8) faces.

According to an embodiment of the disclosure, when viewed toward the first surface (e.g., the first surface 511 in FIG. 8), each of the plurality of antenna elements (e.g., the plurality of antenna elements 521, 522, 523, and 524 in FIG. 8) may have a symmetrical shape in the first direction and/or the third direction. When viewed toward the first surface, the plurality of protrusions (e.g., the plurality of protrusions 841, 842, 843, 844, and 845 in FIG. 8) may be formed to have a height that does not exceed a virtual straight line (e.g., the virtual straight line 801 in FIG. 8) passing through centers of symmetry (e.g., the centers of symmetry C1, C2, C3, and C4 in FIG. 8) of the plurality of antenna elements.

According to an embodiment of the disclosure, the plurality of protrusions (e.g., the plurality of protrusions 841, 842, 843, 844, and 845 in FIG. 8) may have a same height in the first direction and be arranged at regular intervals in the third direction.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including:
   a front plate,
   a rear plate disposed opposite the front plate, and
   a lateral member surrounding a space between the front plate and the rear plate and including a conductive portion and a non-conductive portion; and
   an antenna module disposed in the space and including:
   a printed circuit board (PCB) having a first surface disposed to face the lateral member in the space, and a second surface disposed opposite the first surface, and
   at least one antenna element disposed on the first surface or near the first surface in the PCB, and forming a beam pattern toward the lateral member,
   wherein the conductive portion includes, when viewed toward the first surface, a notch having a recessed shape in a direction from the rear plate to the front plate,
   wherein the non-conductive portion is disposed at least partially in the notch and faces substantially the at least one antenna element,
   wherein the notch has a third surface facing substantially the rear plate, and
   wherein the conductive portion includes at least one protrusion extended from a part of the third surface toward the rear plate and spaced apart from the first surface.

2. The electronic device of claim 1,
   wherein the third surface is disposed closer to the front plate than the at least one antenna element when viewed toward the first surface, and
   wherein the third surface has a region disposed between the at least one protrusion and the first surface and being not in parallel with the first surface.

3. The electronic device of claim 1, wherein when viewed toward the first surface, the at least one protrusion does not overlap the at least one antenna element.

4. The electronic device of claim 1, wherein the at least one antenna element includes an antenna array having a plurality of antenna elements arranged in a third direction which is perpendicular to a first direction from the front plate to the rear plate and is perpendicular to a second direction that the first surface faces.

5. The electronic device of claim 4, wherein the plurality of antenna elements include a patch antenna.

6. The electronic device of claim 4, wherein when viewed toward the first surface, each of the plurality of antenna elements has a symmetrical shape in the first direction and/or the third direction.

7. The electronic device of claim 6, wherein when viewed toward the first surface, the at least one protrusion is extended toward the rear plate from at least the part of the third surface corresponding to a position between centers of symmetry of the plurality of antenna elements.

8. The electronic device of claim 6, wherein when viewed toward the first surface, the at least one protrusion is formed to have a height that does not exceed a virtual straight line passing through centers of symmetry of the plurality of antenna elements.

9. The electronic device of claim 4, wherein the at least one protrusion includes a plurality of protrusions protruded at a same height in the first direction.

10. The electronic device of claim 4, wherein the at least one protrusion includes a plurality of sub-protrusions arranged at regular intervals in the third direction.

11. The electronic device of claim 1, wherein the at least one protrusion is spaced apart from the first surface by $\lambda/2$ or more in a direction that the first surface faces, wherein $\lambda$ indicates wavelength of beam emitted by the antenna module.

12. The electronic device of claim 1, wherein the at least one protrusion includes a conductive pattern attached to the third surface.

13. The electronic device of claim 1, wherein the antenna module further includes a wireless communication circuit disposed on the second surface and electrically connected to the at least one antenna element.

14. The electronic device of claim 13, wherein the wireless communication circuit is configured to transmit and/or receive, through the at least one antenna element, a signal of a specific frequency band which is at least in part ranging from about 6 GHz to about 100 GHz.

15. The electronic device of claim 1, wherein the non-conductive portion forms a lateral surface of the electronic device together with the conductive portion.

16. An electronic device comprising:
a housing including:
  a front plate,
  a rear plate disposed opposite the front plate, and
  a lateral member surrounding a space between the front plate and the rear plate and including a conductive portion and a non-conductive portion; and
an antenna module disposed in the space and including:
  a printed circuit board (PCB) having a first surface disposed to face the lateral member in the space, and a second surface disposed opposite the first surface,
  an antenna array including a plurality of antenna elements disposed on the first surface or near the first surface in the PCB, and forming a beam pattern toward the lateral member, and
  a wireless communication circuit disposed on the second surface, electrically connected to the antenna array, and configured to transmit and/or receive, through the antenna array, a signal of a specific frequency band which is at least in part ranging from about 6 GHz to about 100 GHz,
wherein the conductive portion includes, when viewed toward the first surface, a notch having a recessed shape in a direction from the rear plate to the front plate,
wherein the non-conductive portion is disposed at least partially in the notch and faces substantially the plurality of antenna elements,
wherein the notch has a third surface facing substantially the rear plate and disposed closer to the front plate than the antenna array when viewed toward the first surface,
wherein the conductive portion includes a plurality of protrusions extended from a part of the third surface toward the rear plate, spaced apart from the first surface, and
wherein the plurality of protrusions do not overlap the plurality of antenna elements when viewed toward the first surface.

17. The electronic device of claim 16, wherein the third surface has a region disposed between each of the plurality of protrusions and the first surface and are not in parallel with the first surface.

18. The electronic device of claim 17, wherein the plurality of antenna elements are arranged in a third direction which is perpendicular to a first direction from the front plate to the rear plate and is perpendicular to a second direction that the first surface faces.

19. The electronic device of claim 18,
wherein when viewed toward the first surface, each of the plurality of antenna elements has a symmetrical shape in the first direction and/or the third direction, and
wherein when viewed toward the first surface, the plurality of protrusions are formed to have a height that does not exceed a virtual straight line passing through centers of symmetry of the plurality of antenna elements.

20. The electronic device of claim 19, wherein the plurality of protrusions have a same height in the first direction and are arranged at regular intervals in the third direction.

21. The electronic device of claim 18, wherein when viewed toward the first surface, each of the plurality of antenna elements has one of a circle, square, octagonal, or bow tie shape in the first direction and/or the third direction.

22. The electronic device of claim 18, wherein each of the plurality of protrusions has one of a round shape, a triangular shape, or a trapezoidal shape when viewed toward the first surface.

23. The electronic device of claim 18, wherein at least one of the plurality of protrusions includes a plurality of sub-protrusions.

* * * * *